United States Patent [19]
Baba

[11] Patent Number: 5,768,227
[45] Date of Patent: Jun. 16, 1998

[54] OPTICAL INFORMATION RECORDING AND OR REPRODUCING APPARATUS AND METHOD FOR IRRADIATING A RECORDING MEDIUM HAVING A PLURALITY OF INFORMATION TRACKS

[75] Inventor: Hisatoshi Baba, Yokohama, Japan

[73] Assignee: Canon Kabushiki Kaisha, Tokyo, Japan

[21] Appl. No.: 925,941

[22] Filed: Sep. 8, 1997

Related U.S. Application Data

[63] Continuation of Ser. No. 357,295, Dec. 13, 1994, abandoned.

[30] Foreign Application Priority Data

Dec. 15, 1993 [JP] Japan ................................ 5-314660

[51] Int. Cl.$^6$ ................................ G11B 7/095
[52] U.S. Cl. ................ 369/44.28; 369/44.29; 369/44.32; 369/44.34; 369/44.36
[58] Field of Search ................ 369/44.32, 44.34, 369/44.36, 44.25–44.26, 44.28–44.29

[56] References Cited

U.S. PATENT DOCUMENTS

| | | | |
|---|---|---|---|
| 4,858,214 | 8/1989 | Baba | 369/32 |
| 4,955,011 | 9/1990 | Baba | 369/54 |
| 5,199,011 | 3/1993 | McDonald et al. | 369/44.34 |

*Primary Examiner*—W. R. Young
*Attorney, Agent, or Firm*—Fitzpatrick, Cella, Harper & Scinto

[57] ABSTRACT

An optical information recording and/or reproducing apparatus includes an optical head for irradiating an optical information recording medium having a plurality of information tracks with a light beam, a photosensor which detects light received via the optical information recording medium and is split into a plurality of sections, and signal generating device for generating a focusing error signal, a tracking error signal, and a sum signal as a sum total of outputs from the split sections of the photosensor on the basis of outputs from the photosensor. In the apparatus, a correction signal is generated such that the phase and amplitude of the correction signal match a phase and an amplitude of crosstalk components included in the focusing error signal on the basis of the tracking error signal and the sum signal obtained when the light beam crosses the information tracks. The correction signal is applied to a focusing servo loop so as to cancel the crosswalk components included in the focusing error signal.

8 Claims, 22 Drawing Sheets

FOCUSING ERROR SIGNAL

OUTPUT OF D/A CONVERTER 105

| LENS POSITION | k1 | k2 | k3 |
|---|---|---|---|
| -100μm : L-10 | 1.5 | 0.8 | 0.2 |
| -90μm : L-9 | 1.4 | 0.7 | 0.25 |
| ⋮ | ⋮ | ⋮ | ⋮ |
| 0μm : L 0 | 1.1 | 0.8 | 0.3 |
| ⋮ | ⋮ | ⋮ | ⋮ |
| 90μm : L 9 | 1.3 | 1.1 | 0.2 |
| 100μm : L 10 | 1.4 | 0.9 | 0.25 |

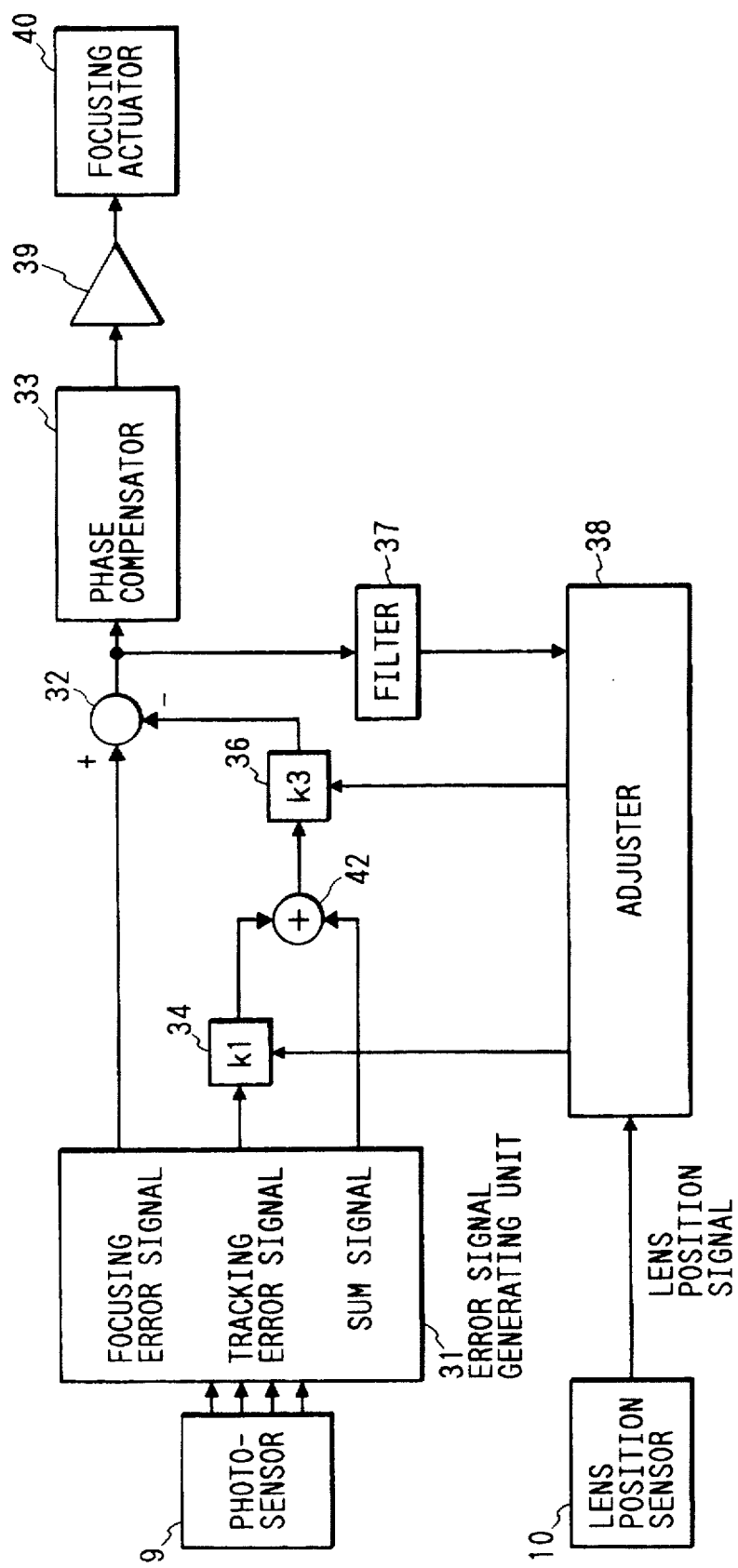

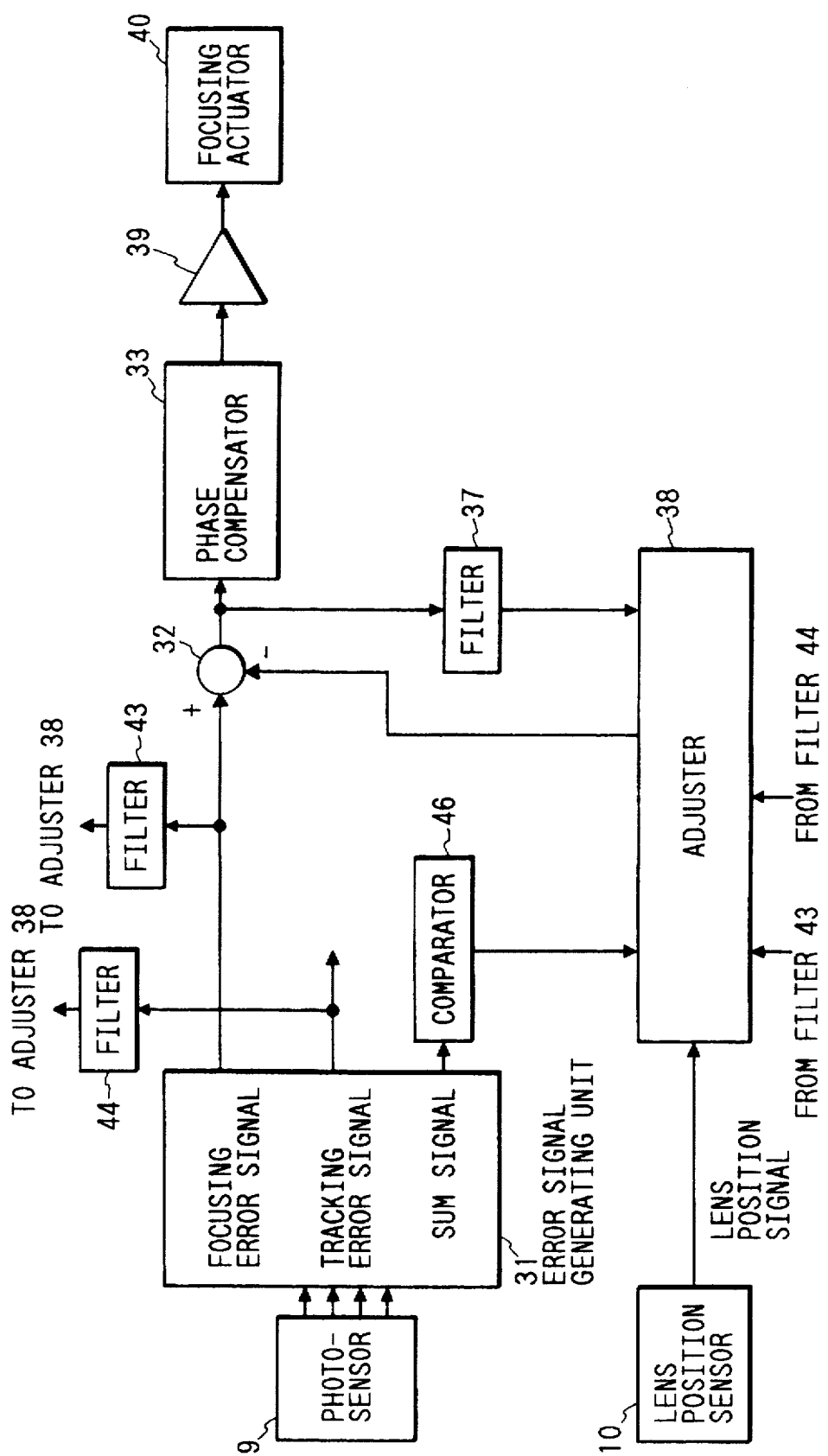

TRACKING ERROR SIGNAL

SUM SIGNAL

CROSSTALK

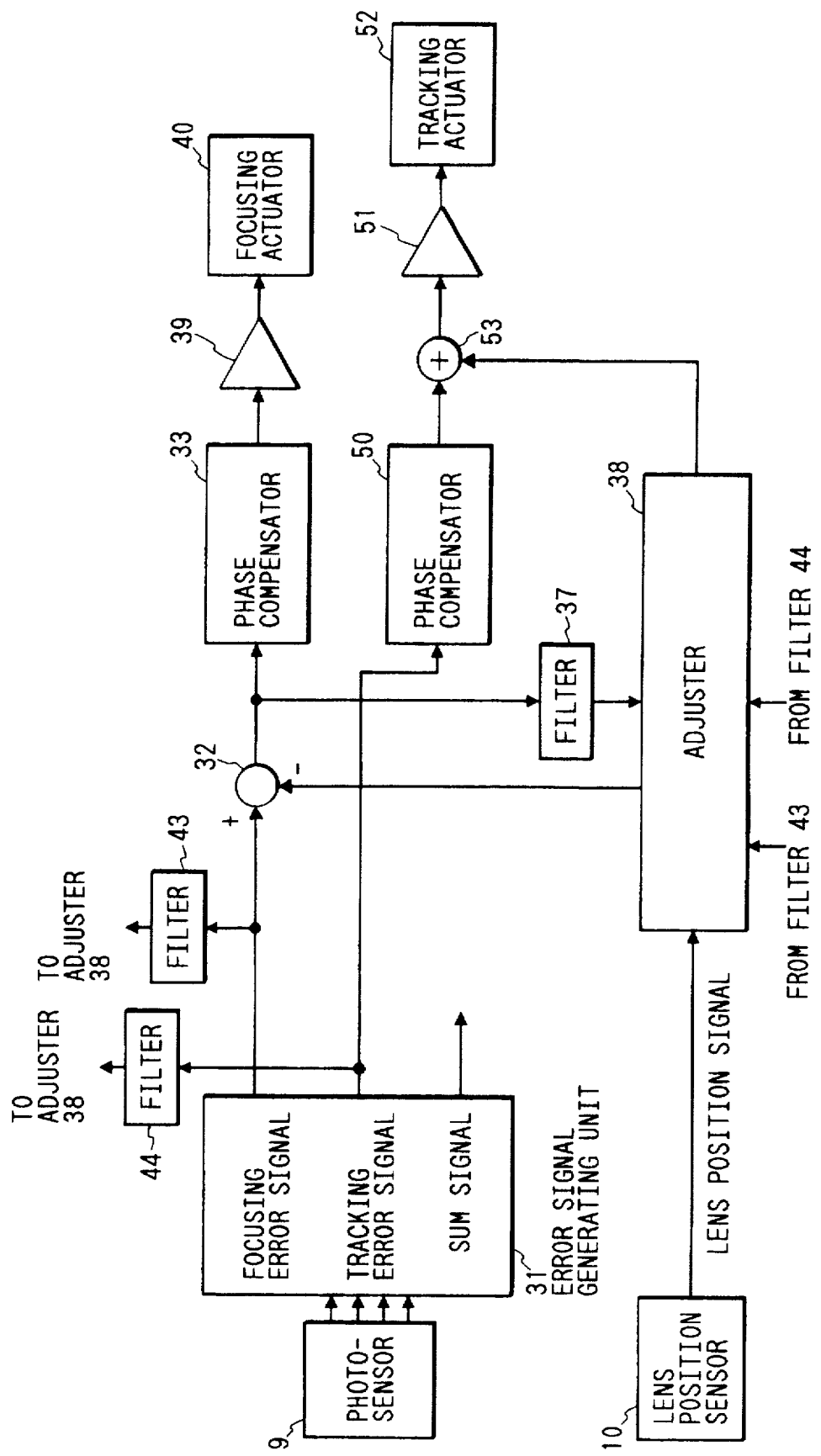

TRACKING ERROR SIGNAL

CROSSTALK

OPTICAL INFORMATION RECORDING AND OR REPRODUCING APPARATUS AND METHOD FOR IRRADIATING A RECORDING MEDIUM HAVING A PLURALITY OF INFORMATION TRACKS

This application is a continuation of application Ser. No. 08/357,295 filed Dec. 13, 1994, now abandoned.

BACKGROUND OF THE INVENTION

1. Field of the Invention

The present invention relates to an optical information recording/reproduction apparatus for recording or reproducing information on or from an optical information recording medium such as an optical disc and, more particularly, to a focusing control apparatus for controlling focusing of a light beam irradiated onto a recording medium.

2. Related Background Art

FIG. 1 is a block diagram showing a focus servo loop of a conventional optical disc apparatus. Referring to FIG. 1, a feedback point 100 receives a disc surface position, which serves as a target position of a light spot, as a positive value, and the position of a focusing actuator 107, i.e., the focal point position of the light spot as a negative value.

The feedback point 100 calculates an error between the disc surface position and the position of the actuator 107, and outputs the calculated error as a focusing error signal. When such a focusing error signal is generated in practice, a light beam reflected by the surface of an optical disc is detected by a photosensor, and the focusing error signal is optically detected.

The focusing error signal is converted into a digital signal by an A/D converter 101, and the digital signal is output to a DSP (digital signal processor) 102. The DSP 102 has a phase compensation unit 103 and a digital gain unit 104. The focusing error signal is subjected to phase compensation in the phase compensation unit 103, and its gain is adjusted by the digital gain unit 104, thus stabilizing a servo loop. The signal processed by the DSP 102 is converted into an analog signal by a D/A converter 105, and the analog signal is output to a driver 106. The driver 106 drives the focusing actuator 107. The focusing actuator 107 performs focusing control by displacing an objective lens in the focusing direction by means of an electromagnetic force of a magnetic circuit and a voice coil, so that the light spot forms a focal point on the disc surface. Upon execution of the focusing control by the focusing servo loop, the light spot can be maintained in an in-focus state on the disc surface even when the optical disc is rotating and vibrates.

When information is recorded or reproduced on or from the optical disc, tracking control is performed, so that the light spot does not fall outside an information track. For this purpose, guide grooves and information strings, which are used for guiding the light spot upon execution of the tracking control, are arranged on the optical disc. The optical disc apparatus has a function of randomly accessing information on the disc surface, and performs a so-called seek operation for moving an optical head in a track crossing direction to access a desired information track. However, since the focusing error signal is generated on the basis of light reflected by the disc surface, when the light spot crosses an information track by the seek operation, crosstalk components generated by a guide groove for tracking are undesirably mixed in the focusing error signal. During normal tracking control, crosstalk components generated by a guide groove are mixed in the focusing error signal due to even a small tracking error, and adversely influence focusing control. This problem will be described below with reference to FIGS. 2A and 2B.

FIG. 2A shows the focusing error signal, and FIG. 2B shows the output signal from the D/A converter 105 shown in FIG. 1. When crosstalk components are mixed in the focusing error signal, the output from the D/A converter 105 is saturated, as shown in FIG. 2B, and normal focusing control is disturbed, thus causing a defocus state to occur. When the output from the D/A converter 105 is saturated, large noise components are superposed on a driving signal for the focusing actuator 107, resulting in problems such as an increase in power consumption, a rise in the apparatus temperature, a rasping noise generated by the focusing actuator 107, and the like. In the worst case, an out-of-focus state occurs. As described above, in the conventional apparatus, when the light spot crosses a track, the focusing servo loop becomes unstable due to crosstalk components generated by a guide groove, and in the worst case, an out-of-focus state occurs, and the focusing servo must be led in again. Also, as described above, the focusing servo causes a defocus state to occur under the influence of crosstalk components due to even a small tracking error, thus impairing the precision of the focusing servo.

SUMMARY OF THE INVENTION

The present invention has been made in consideration of the conventional problems, and has as its object to provide an optical information recording and/or reproduction apparatus and an optical information recording and/or reproduction method, which can stabilize a focusing servo during a seek operation of an optical head by canceling crosstalk components included in a focusing error signal, and can prevent a decrease in precision of a focusing servo system during tracking control, thus assuring precise focusing control.

According to the present invention, there is provided an optical information recording and/or reproduction apparatus, which comprises an optical head for irradiating an optical information recording medium having a plurality of information tracks with a light beam, a photosensor which detects light received via the optical information recording medium and is split into a plurality of sections, and signal generating means for generating a focusing error signal, a tracking error signal, and a sum signal as a sum total of outputs from the split sections of the photosensor on the basis of outputs from the photosensor, comprising:

correction signal generating means for generating a correction signal whose phase and amplitude match a phase and an amplitude of crosstalk components included in the focusing error signal on the basis of the tracking error signal and the sum signal obtained when the light beam crosses the information tracks; and correction signal applying means for canceling the crosstalk components included in the focusing error signal by applying the correction signal to a focusing servo loop.

According to the present invention, there is also provided an optical information recording and/or reproduction method for irradiating an optical information recording medium having a plurality of information tracks with a light beam, detecting light received via the optical information recording medium using a photosensor which is split into a plurality of sections, and generating a focusing error signal, a tracking error signal, and a sum signal as a sum total of outputs from the split sections of the photosensor on the basis of outputs from the photosensor, comprising the steps of:

generating a correction signal whose phase and amplitude match a phase and an amplitude of crosstalk components included in the focusing error signal on the basis of the tracking error signal and the sum signal obtained when the light beam crosses the information tracks; and canceling the crosstalk components included in the focusing error signal by applying the correction signal to a focusing servo loop.

According to the present invention, there is also provided an optical information recording and/or reproduction apparatus, which comprises an optical head for irradiating an optical information recording medium with a light beam, a photosensor which detects light received via the optical information recording medium and is split into a plurality of sections, and signal generating means for generating a focusing error signal and a tracking error signal on the basis of outputs from the photosensor, wherein the apparatus includes:

a focusing actuator for displacing the light beam in a focusing direction;

a tracking actuator for displacing the light beam in a tracking direction;

a focusing servo loop for driving the focusing actuator on the basis of the focusing error signal;

a tracking servo loop for driving the tracking actuator on the basis of the tracking error signal;

measuring means for measuring a relationship between a value of the tracking error signal and a crosstalk amount in the focusing error signal; and crosstalk correction means for canceling the crosstalk components included in the focusing error signal by applying a signal corresponding to the value of the tracking error signal to the focusing servo loop on the basis of the relationship measured by the measuring means while the tracking servo loop is active.

Other constructions and methods according to the present invention will be apparent from the description discussed below.

BRIEF DESCRIPTION OF THE DRAWINGS

FIG. 18 is a block diagram showing the second embodiment of the present invention;

FIG. 21 is a block diagram showing the fourth embodiment of the present invention;

FIG. 23 is a block diagram showing the fifth embodiment of the present invention;

DETAILED DESCRIPTION OF THE PREFERRED EMBODIMENTS

Figure 1:
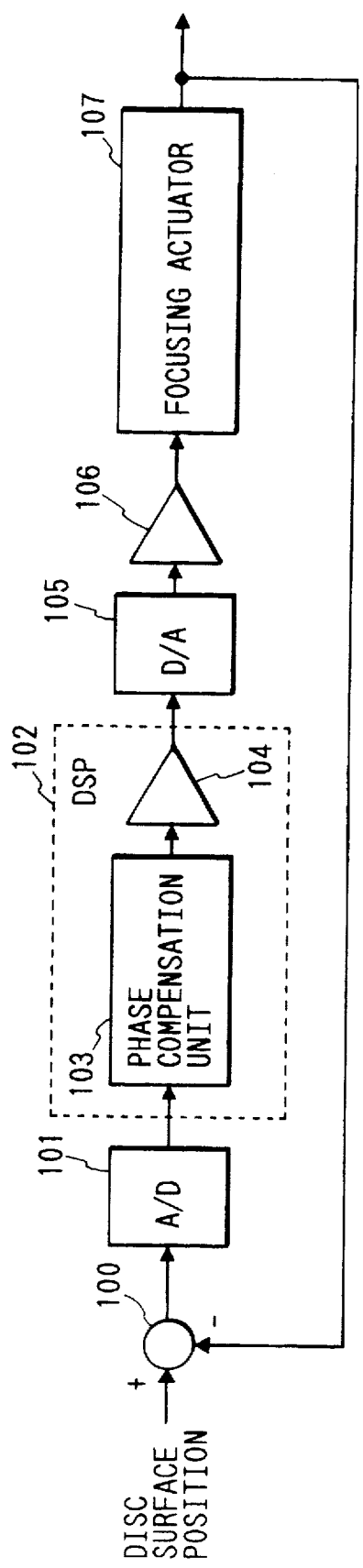
FIG. 1 is a block diagram showing a focusing servo loop of a conventional optical disc apparatus.
Figure 2A:
FIGS. 2A and 2B are signal waveform charts showing a focusing error signal and the output from a D/A converter in the servo loop shown in FIG. 1.
Figure 2B:
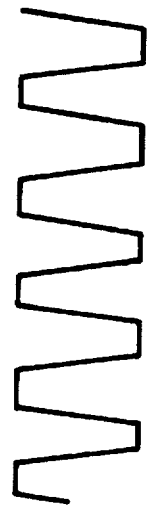
Figure 3:
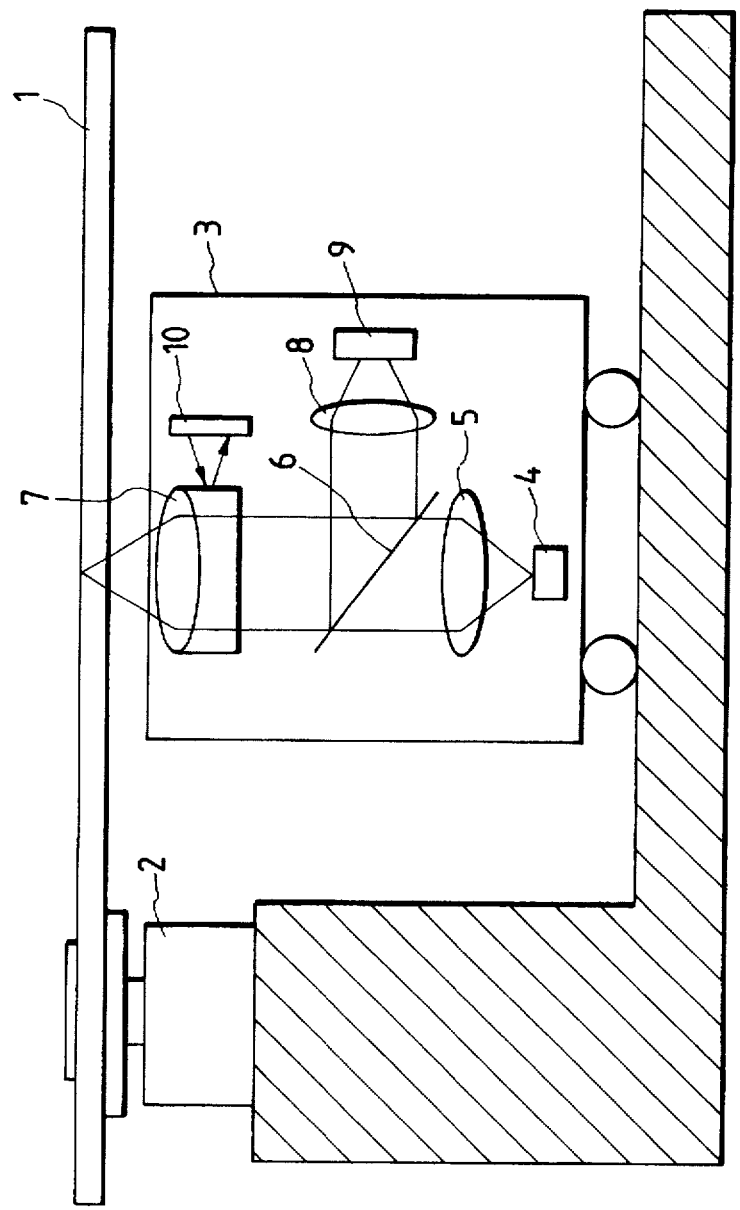
FIG. 3 is a schematic sectional view showing the entire arrangement of an optical information recording/reproduction apparatus according to the present invention.

The preferred embodiments of the present invention will be described in detail hereinafter with reference to the accompanying drawings. The entire arrangement of an optical information recording/reproduction apparatus according to the present invention will be described below with reference to FIG. 3. Referring to FIG. 3, an optical disc 1 as an information recording medium is rotated at a constant speed (e.g., 3,600 rpm) by a driving force from a motor 2. A plurality of circumferential information tracks are arranged on the optical disc 1. An information track may be defined by continuous pits like in a compact disc or may be defined by a continuous groove called a guide groove as long as the track can be optically detected by some means. An optical head 3 is movable in the radial direction of the optical disc 1 along a guide rail (not shown), and can access an arbitrary track on the disc. The movement, in the radial direction, of the optical head 3 is called a seek operation, and the optical head can record information or reproduce recorded information by accessing a desired track by the seek operation.

The optical head 3 comprises optical elements such as a semiconductor laser 4 as a light source, a collimator lens 5, a half mirror 6, an objective lens 7, a sensor lens 8, a photosensor 9, a lens position sensor 10, and the like. Although not shown in FIG. 3, the optical head also comprises a focusing actuator for controlling the focal point of a light beam by driving the objective lens 7 in a focusing direction, and a tracking actuator for controlling tracking of the light beam by driving the objective lens 7 in a tracking direction. The lens position sensor 10 is a sensor for detecting the position, in the tracking direction, of the objective lens 7, and comprises a pair of a light-emitting element and a light-receiving element. Light emitted from the light-emitting element is projected onto a reflection plate adhered to the side surface of a lens barrel of the objective lens 7, and the light reflected by the reflection plate is received by the light-receiving element. Therefore, when the objective lens 7 moves in the tracking direction, since the amount of light received by the light-receiving element changes accordingly, the position, in the tracking direction, of the objective lens 7 can be detected in correspondence with the amount of light received by the light-receiving element.

A light beam emitted from the semiconductor laser 4 is collimated by the collimator lens 5, is transmitted through the half mirror 6, and is incident on the objective lens 7. The light beam transmitted through the half mirror 6 is focused by the objective lens 7, and irradiates the optical disc 1 as a very small light spot. The light beam irradiating onto the optical disc 1 is reflected by the disc surface, and the reflected light is collimated again via the objective lens 7. The light beam collimated by the objective lens 7 is reflected by the half mirror 6, and is incident on the photosensor 9 via the sensor lens 8.

The photosensor 9 comprises a multi-split photosensor whose detection surface is divided into a plurality of detection segments, and outputs electrical signals in accordance with the amounts of light incident on these detection segments. The detection signals from the detection segments of the multi-split photosensor are combined by an error signal generating unit, which is arranged at the output side of the photosensor, thereby detecting the focusing error state and the tracking error state of the light spot irradiated onto the optical disc 1. Also, a sum total of the outputs from the detection segments is calculated to generate a sum signal. As a method of detecting a focusing error signal of the light spot, many methods have been proposed so far, and for example, an astigmatism method, a knife edge method, a beam size method, a Foucault's method, a critical angle method, and the like are known. Also, as a method of detecting a tracking error signal, a push-pull method, a heterodyne method, a 3-beam method, and the like are known. Therefore, this embodiment can adopt any of these methods as the methods of detecting the focusing and tracking error signals. Note that the light reflected by the optical disc 1 is detected by the photosensor 9 in FIG. 3. Alternatively, light transmitted through the disc may be detected to detect error signals.

Figure 4:
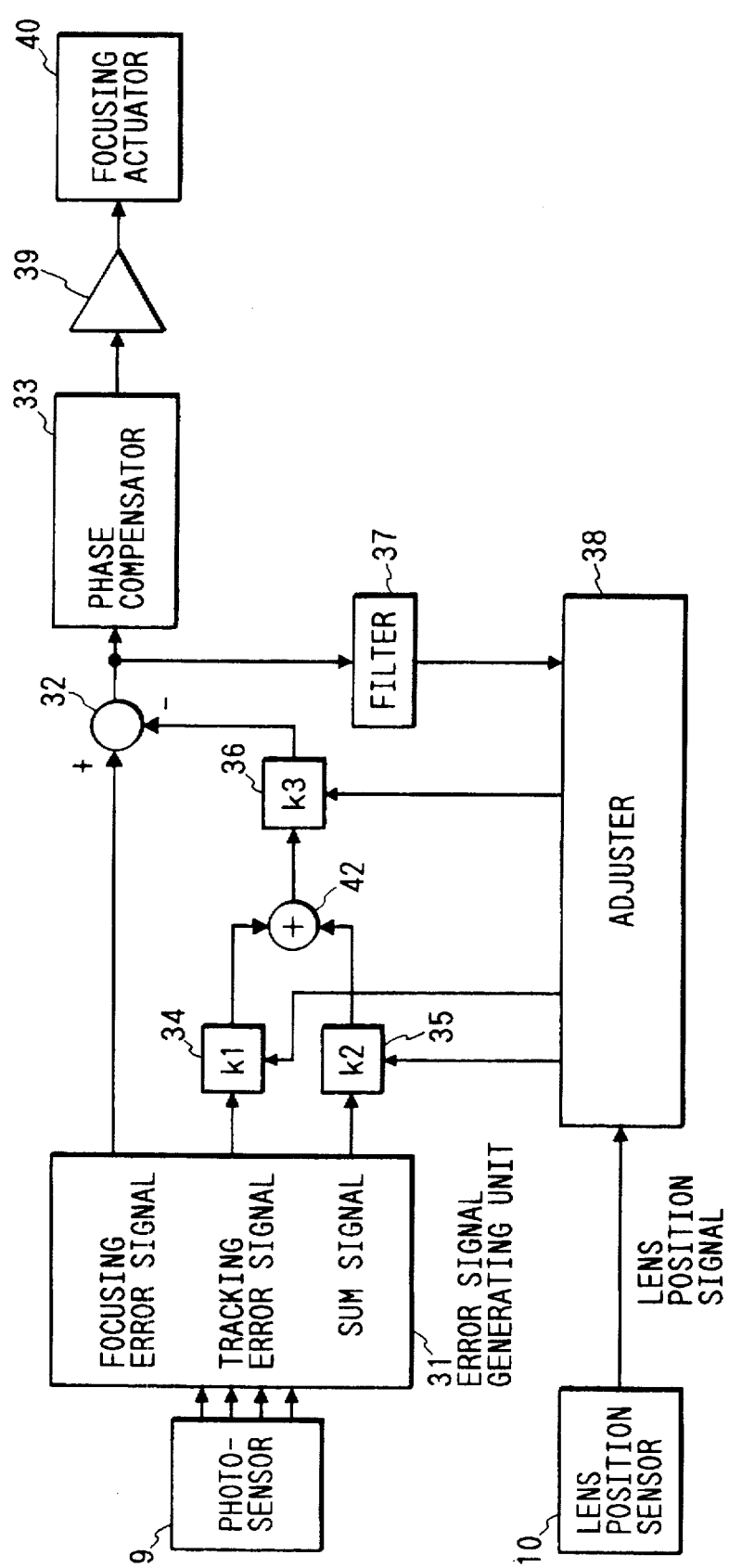
FIG. 4 is a block diagram showing the first embodiment of a focusing control apparatus for the optical information recording/reproduction apparatus according to the present invention.

FIG. 4 is a block diagram showing the first embodiment of a focusing control circuit for the optical information recording/reproduction apparatus according to the present invention. Referring to FIG. 4, the multi-split photosensor 9, and the lens position sensor 10 for detecting the position, in the tracking direction, of the objective lens 7, have already been described above with reference to FIG. 3. The detection signals from the detection segments of the photosensor 9 are supplied to an error signal generating unit 31, and the unit 31 detects a focusing error signal which represents an error between the focal point position of the light spot and the disc surface, a tracking error signal which represents a position error between the light spot and an information track, and a sum signal as a sum total of the detection signals from the photosensor 9. As the methods of detecting the focusing and tracking error signals, some methods are known and any of these methods may be adopted, as described above. However, since these methods are known to those who are skilled in the art, a detailed description thereof will be omitted.

A correction addition point 32 applies a crosstalk correction signal to the focusing servo loop. More specifically, the correction addition point 32 applies a crosstalk correction signal output from a multiplier 36 (to be described later) to the focusing servo loop to remove crosstalk components included in the focusing error signal. A phase compensator 33 performs phase compensation of the focusing error signal to stabilize the focusing servo loop, and a driver 39 drives a focusing actuator 40. These constituting elements from the photosensor 9 to the focusing actuator 40 constitute the focusing servo loop. The focusing servo loop drives the focusing actuator 40 on the basis of the focusing error signal to control the objective lens 7 in the focusing direction, thus achieving the focusing control.

The circuit shown in FIG. 4 includes multipliers 34 to 36, an adder 42 for adding the outputs from the multipliers 34 and 35, a filter 37 for fetching the output from the correction addition point 32, and an adjuster 38 for adjusting multipliers k1 to k3 of the multipliers 34 to 36 while monitoring the output from the correction addition point 32 via the filter 37 so as to generate a correction signal whose phase and amplitude match those of crosstalk components. The tracking error signal output from the error signal generating unit 31 is multiplied with the multiplier k1 by the multiplier 34, and is multiplied with the multiplier k2 by the multiplier 35. These product signals are added to each other by the adder 42. The sum signal is multiplied with the multiplier k3 by the multiplier 36, and the product signal is output to the correction addition point 32 as a crosstalk correction signal. The adjuster 38 adjusts the multipliers k1 to k3 of the multipliers 34 to 36 while monitoring the output from the correction addition point 32 to generate a crosstalk correction signal. The adjuster 38 also receives a lens position signal of the objective lens 7 from the lens position sensor 10, and also adjusts the multipliers k1 to k3 of the multipliers 34 to 36 in accordance with the position of the objective lens 7.

The detailed operation of this embodiment will be explained below. When the apparatus is started or when the optical disc 1 is set in the apparatus, the adjuster 38 adjusts the multipliers of the multipliers 34 to 36. With this adjustment, a correction signal whose phase and amplitude match those of crosstalk components is generated. Upon adjustment of the multipliers, the adjuster 38 sets the multiplier k3 of the multiplier 36 to be a standard value. The standard value is an average value of the multiplier k3, and may be determined on the basis of the design value of the optical system of the apparatus or multipliers k3 of a plurality of apparatuses may be actually measured to determine an average value of these values as the standard value.

The multipliers k1 and k2 are similarly set to be standard values. Upon completion of setting of the multipliers, the motor 2 is driven to rotate the optical disc 1 at a predetermined rotational speed (e.g., 3,600 rpm), and the semiconductor laser 4 is turned to lead in the focusing servo. Note that the tracking servo is kept OFF. Since the lead-in operation of the focusing servo is known to those who are skilled in the art, a detailed description thereof will be omitted. When the focusing servo is led in, since the optical disc 1 and the motor 2 normally suffer eccentricity, the light beam irradiated from the optical head 3 moves in a direction to cross a track.

Figure 5:
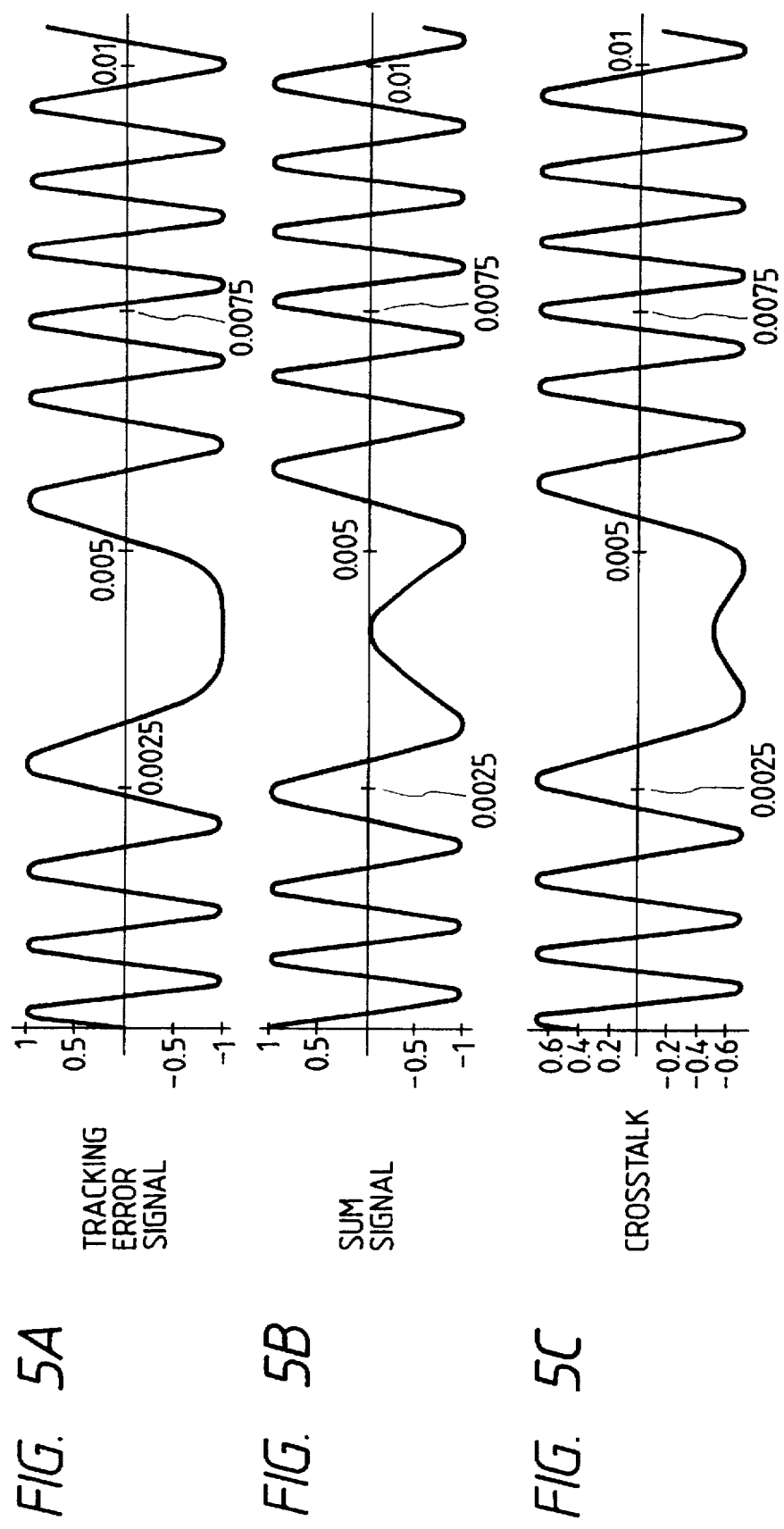
FIGS. 5A, 5B, and 5C are signal waveform charts showing a tracking error signal and a sum signal generated by an error signal generating unit in the embodiment shown in FIG. 4, and crosstalk components in the focusing error signal.

FIGS. 5A to 5C show signals of the respective units at that time. FIG. 5A shows the tracking error signal, FIG. 5B shows the sum signal, and FIG. 5C shows crosstalk components appearing in the focusing error signal. Although the sum signal originally includes a DC component, FIG. 5B shows a waveform after the DC component is cut, for the sake of simplicity. When the light beam crosses tracks, the tracking error signal changes in a sine waveform pattern, as shown in FIG. 5A, and one period of the tracking error signal at that time corresponds to a single track. The sum signal shown in FIG. 5B has a 90° phase difference from the tracking error signal, and the phase may be advanced or delayed in correspondence with the crossing direction. In FIGS. 5A to 5C, when the light beam crosses one direction due to the eccentricity, the phase of the sum signal is advanced by 90° from that of the tracking error signal. However, when the moving direction is reversed during the movement, the phase of the sum signal is delayed by 90° from that of the tracking error signal. In this manner, since the tracking error signal and the sum signal periodically change with respect to the tracks, and have a 90° phase difference therebetween, the position, in one track pitch, of the light beam can be detected based on the tracking error signal and the sum signal.

On the other hand, the crosstalk components in the focusing error signal shown in FIG. 5C are generated in correspondence with the positional relationship with the track as well due to aberrations of the optical system. Note that the positional relationship between the crosstalk components and the tracking error signal or the sum signal is not constant, varies depending on apparatuses or discs, and also changes in correspondence with the position, in the tracking direction, of the objective lens 7. In FIGS. 5A to 5C, the light beam crosses five to six tracks due to the eccentricity, and a clear track crossing signal is obtained. However, when the amount of eccentricity is small, the light beam may not cross a single track or more, and a complete track crossing signal cannot often be obtained. In this case, the light beam is forcibly scanned in the track crossing direction by the tracking actuator to obtain a complete track crossing signal. Alternatively, the optical head 3 may be moved in the track crossing direction in this case.

When the focusing servo is led in after the multipliers k1 to k3 of the multipliers 34 to 36 are set to be standard values, the light beam moves in the track crossing direction due to the eccentricity of the optical disc 1, and the tracking error signal, the sum signal, and t he crosstalk component s in the focusing error signal change accordingly, as shown in FIGS. 5A to 5C. At this time, the focusing error signal of the focusing servo loop is monitored by the adjuster 38 on the basis of the output from the correction addition point 32 via the filter 37, and the adjuster 38 adjusts the multipliers k1 to k3 of the multipliers 34 to 36 on the basis of the obtained focusing error signal. The adjuster 38 preferably comprises a microcomputer, and can monitor the output from the filter 37 after the output from the filter 37 is converted into a digital signal by, e.g., an A/D converter.

The multipliers are adjusted as follows. Since the multipliers k1 and k2 of the multipliers 34 and 35 comprise coefficients to be multiplied with the tracking error signal and the sum signal corresponding to a sine wave and a cosine wave, if the amplitudes of the tracking error signal and the sum signal are equal to each other, the following relationship is established:

$$(k1 \times k1) + (k2 \times k2) = \text{constant} \tag{1}$$

Therefore, the amplitude of the input signal to the multiplier 36 after the outputs from the multipliers 34 and 35 are added to each other remains the same, and only its phase varies. The adjuster 38 performs processing for detecting the phases of the focusing error signal and crosstalk components by utilizing this relationship. The outputs from the multipliers 34 and 35 are added to each other by the adder 42, and the sum signal is output to the multiplier 36. In this case, when the multipliers k1 and k2 of the multipliers 34 and 35 are changed while maintaining the relationship given by equation (1), the output from the multiplier 36 becomes a signal, the amplitude of which is constant, and only the phase of which changes. This signal is output to the correction addition point 32, and is added to the focusing error signal. When the multipliers k1 and k2 of the multipliers 34 and 35 are changed, the phase of the focusing error signal coincides with that of crosstalk component when the output amplitude of the correction addition point 32 becomes minimum. For this reason, the adjuster 38 monitors the output amplitude of the correction addition point 32 via the filter 37, and searches for multipliers k1 and k2 corresponding to the minimum point of the amplitude.

More specifically, the adjuster 38 changes the multipliers k1 and k2 by fine steps, measures the output amplitude of the correction addition point 32 at that time, and detects multipliers k1 and k2 when the output amplitude becomes minimum as optimal multiplier values. Of course, when the multipliers k1 and k2 are determined, the multipliers k1 and k2 of the multipliers 34 and 35 are fixed to the determined values. When the multipliers k1 and k2 are changed, combinations of the multipliers k1 and k2 (e.g., 100 combinations) are programmed in advance, and the adjuster 38 changes the multipliers k1 and k2 in predetermined combinations to search for multipliers k1 and k2 corresponding to the minimum output amplitude of the correction addition point 32. Alternatively, the multipliers k1 and k2 may be changed by coarse steps in, e.g., about 10 combinations to detect multipliers k1 and k2 obtained when the output amplitude of the correction addition point 32 becomes substantially a minimum. Thereafter, the multipliers k1 and k2 may be changed by fine steps to detect multipliers k1 and k2 obtained when the output amplitude of the correction addition point 32 precisely corresponds to a minimum point. With this method, since the multipliers k1 and k2 are roughly detected by the coarse steps, the search time can be shortened.

When the multipliers k1 and k2 are set, as described above, the relationship between the multipliers k1 and k2 is given by the following equation from equation (1):

$$\sqrt{(k2 \times k2)} = \sqrt{[(\text{constant}) - (k1 \times k1)]} \tag{2}$$

Therefore, the multipliers k1 and k2 can be obtained from equation (2). Since the multipliers k1 and k2 are uniquely determined by calculating a square root of equation (1), combinations of the multipliers k1 and k2 are programmed in advance based on them, and the multipliers k1 and k2 are simultaneously switched in accordance with the programmed combinations. Also, a sine function and a cosine function may be used to set the multipliers k1 and k2. More specifically, when a variable $\alpha$ in k1=sine($\alpha$) and k2=cos($\alpha$) are changed, the multipliers k1 and k2 can maintain the relationship given by equation (1). Of course, the function may be multiplied with a coefficient $\beta$ like k1=$\beta\times$sin($\alpha$) to convert the multiplier to an appropriate numerical value.

Furthermore, as another method of adjusting the multipliers, the following method is available. For example, if the amplitude of the correction addition point 32 increases when the multiplier k1 is increased, a multiplier k1 corresponding to the minimum value is smaller than the current value. For this reason, the multiplier k1 is decreased in turn, and if the amplitude decreases upon a decrease in multiplier k1, the multiplier k1 is further decreased to finally detect a multiplier k1 corresponding to the minimum amplitude of the correction addition point 32. Of course, the multiplier k2 can be changed simultaneously with the multiplier k1 to satisfy the relationship given by equation (2).

Upon completion of the adjustment of the multipliers k1 and k2, the adjuster 38 performs processing for adjusting the multiplier k3 of the multiplier 36. When the multiplier k3 is adjusted, since the phase of the output signal from the multiplier 36 has already matched that of crosstalk component in the focusing error signal upon adjustment of the multipliers k1 and k2, the multiplier k3 is increased or decreased to search for a multiplier k3 obtained when the output amplitude of the correction addition point 32 coincides with a minimum point. More specifically, since the output signal from the multiplier 36 is output to the correction addition point 32 in a state wherein its phase matches that of crosstalk components, crosstalk components in the focusing error signal are maximally canceled when the multiplier k3 is changed and the output amplitude of the correction addition point 32 becomes a minimum. Therefore, the multiplier k3 obtained when the output amplitude of the correction addition point 32 becomes a minimum is detected as a multiplier to be adjusted.

When the multiplier k3 is adjusted, the adjuster 38 changes the multiplier k3 by a fine step and measures the output amplitude of the correction addition point 32 as in the adjustment of the multipliers k1 and k2. Then, the adjuster 38 detects the multiplier k3 obtained when the output amplitude of the correction addition point 32 becomes a minimum, and adjusts the multiplier k3 to the detected value. At this time as well, 100 different multipliers k3 are programmed in advance, and the adjuster 38 sequentially changes the multiplier k3 in correspondence with these values and measures the output amplitude of the correction addition point 32, thereby searching for a desired multiplier k3. Alternatively, for example, 10 different multipliers k3 at a coarse step may be set to detect a multiplier k3 obtained when the output amplitude of the correction addition point 32 substantially coincides with a minimum point, and thereafter, the multiplier k3 may be changed by a fine step to finely adjust the multiplier k3.

Furthermore, the following method may be adopted. That is, if the output amplitude of the correction addition point 32 increases when the multiplier k3 is increased, the multiplier k3 to be detected is smaller than the current value. For this reason, the multiplier k3 is decreased in turn, and when the output amplitude of the correction addition point 32 decreases upon the decrease in multiplier k3, the multiplier k3 is further decreased to finally detect a multiplier k3 corresponding to the minimum output amplitude of the correction addition point 32. More specifically, the output amplitude of the correction addition point 32 may be monitored, and the multiplier k3 may be changed in correspondence with the direction of the change in amplitude, thereby detecting a multiplier k3 corresponding to the minimum output amplitude of the correction addition point 32.

When a multiplier k3 corresponding to the minimum output amplitude of the correction addition point 32 is detected, the adjuster 38 fixes the multiplier k3 of the multiplier 36 to the detected value, and ends the adjustment of the multiplier k3. In this manner, the adjustment of the multipliers k1, k2, and k3 of the multipliers 34, 35, and 36 is completed, and a correction signal whose phase and amplitude match those of crosstalk components is generated. During a normal operation of the apparatus, the correction signal is applied to the focusing servo loop by the correction addition point 32, and is subtracted from the focusing error signal, thus canceling crosstalk components.

This embodiment utilizes the fact that if the amplitudes of the tracking error signal and the sum signal are equal to each other, and satisfy the relationship given by equation (1) therebetween, the amplitude of a signal obtained by adding these signals remains the same, and only its phase changes. Thus, the tracking error signal and the sum signal are respectively multiplied with the multipliers k1 and k2 by the multipliers 34 and 35, and the multipliers k1 and k2 are adjusted to values corresponding to the minimum output amplitude of the correction addition point 32 by changing the multipliers k1 and k2, thereby matching the phase of the crosstalk correction signal to be output from the multiplier 36 to the correction addition point 32 with the phase of crosstalk components included in the focusing error signal. After the adjustment of the multipliers k1 and k2, the multiplier k3 of the multiplier 36 is adjusted to a value corresponding to the minimum output amplitude of the correction addition point 32 by changing the multiplier k3, thus matching the amplitude of the crosstalk correction signal with that of crosstalk components in the focusing error signal.

Therefore, since the multiplier 36 applies the correction signal whose phase and amplitude coincide with those of crosstalk components to the correction addition point 32, crosstalk components included in the focusing error signal when the light beam crosses tracks can be effectively canceled. Therefore, since crosstalk components in the focusing error signal can be removed, an out-of-focus state during the seek operation can be prevented, and noise can be prevented from being superposed on a driving signal for the focusing actuator, thus avoiding an increase in power consumption, a rise in the apparatus temperature, a rasping noise generated by the focusing actuator, and the like. In this manner, stable seek control can be realized, not only in the seek operation but also in tracking control, since crosstalk components generated due to a tracking error can be canceled, and the crosstalk components can be precisely canceled over the entire movable range of the objective lens 7, and the focusing servo can be precisely controlled.

In order to more precisely cancel crosstalk components in the focusing error signal, after the multipliers k1 to k3 are adjusted by the above-mentioned method, the multipliers are preferably re-adjusted one more time. More specifically, since the multipliers have been brought close to values corresponding to an actual crosstalk amount and coarse adjustment has been attained in the first adjustment, crosstalk components can be canceled more precisely by the second adjustment. When the adjustment of the multipliers is repetitively performed like the third adjustment, fourth adjustment, . . . . the correction precision of crosstalk components can be further improved. When the multipliers k1 and k2 are adjusted, the multipliers k1 and k2 are changed while maintaining a predetermined relationship therebetween, as described above. Alternatively, the following method may be used. That is, the multiplier k1 is set to be a constant value, and the multiplier k2 is changed to be adjusted to a value corresponding to the minimum output amplitude of the correction addition point 32. Thereafter, the multiplier k2 is changed to be adjusted to a value corresponding to the minimum output amplitude of the correction addition point 32. The adjustment order of the multipliers k1 and k2 may be reversed.

Figure 6:
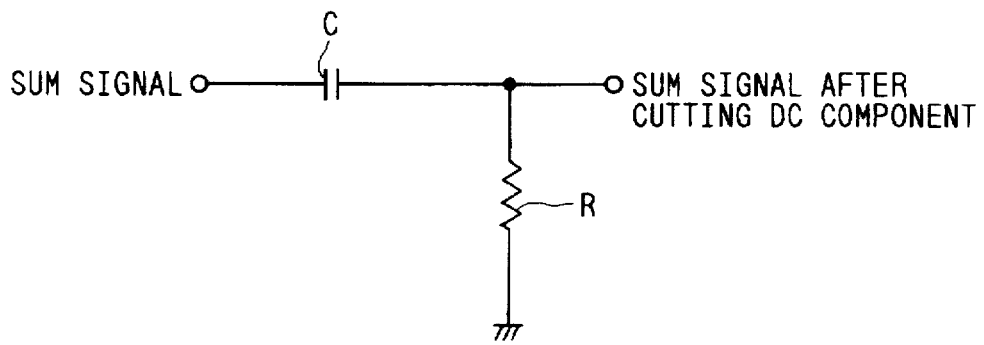
FIG. 6 is a circuit diagram showing an example of a DC cut unit for cutting a DC component of the sum signal.
Figure 7:
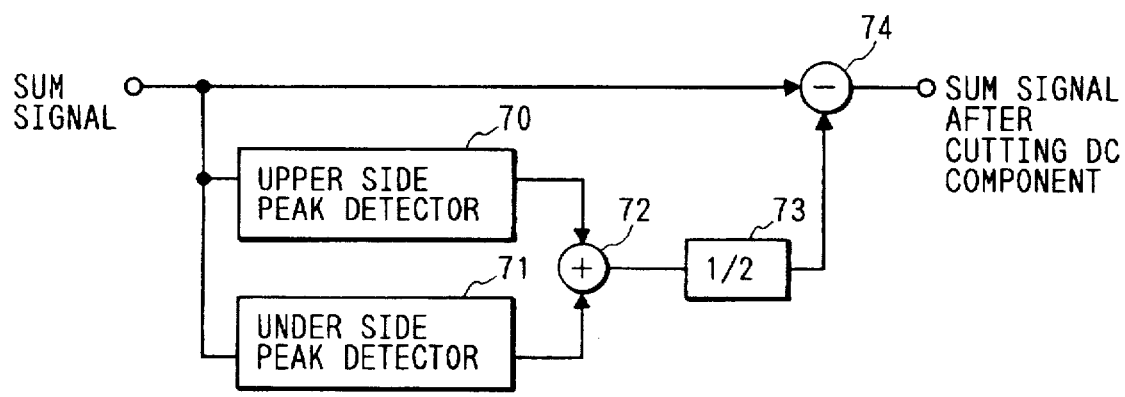
FIG. 7 is a block diagram showing another example of the DC cut unit.

In the above embodiment, the waveform of the sum signal, from which a DC component is cut, is illustrated. In order to cut a DC component, a method of arranging a high-pass filter comprising a resistor R and a capacitor C is available, as shown in, e.g., FIG. 6. Also, as shown in FIG. 7, the positive and negative peak values of the sum signal are detected by upper and lower side peak detectors 70 and 71, and are added to each other by an adder 72. The sum value is divided by a ½ divider 73 to calculate an average value, and the average value is subtracted from the sum signal by a subtracter 74, thereby cutting a DC component. Of course, the DC component cut processing can be realized by digital processing using an A/D converter, and the like.

Figure 8:
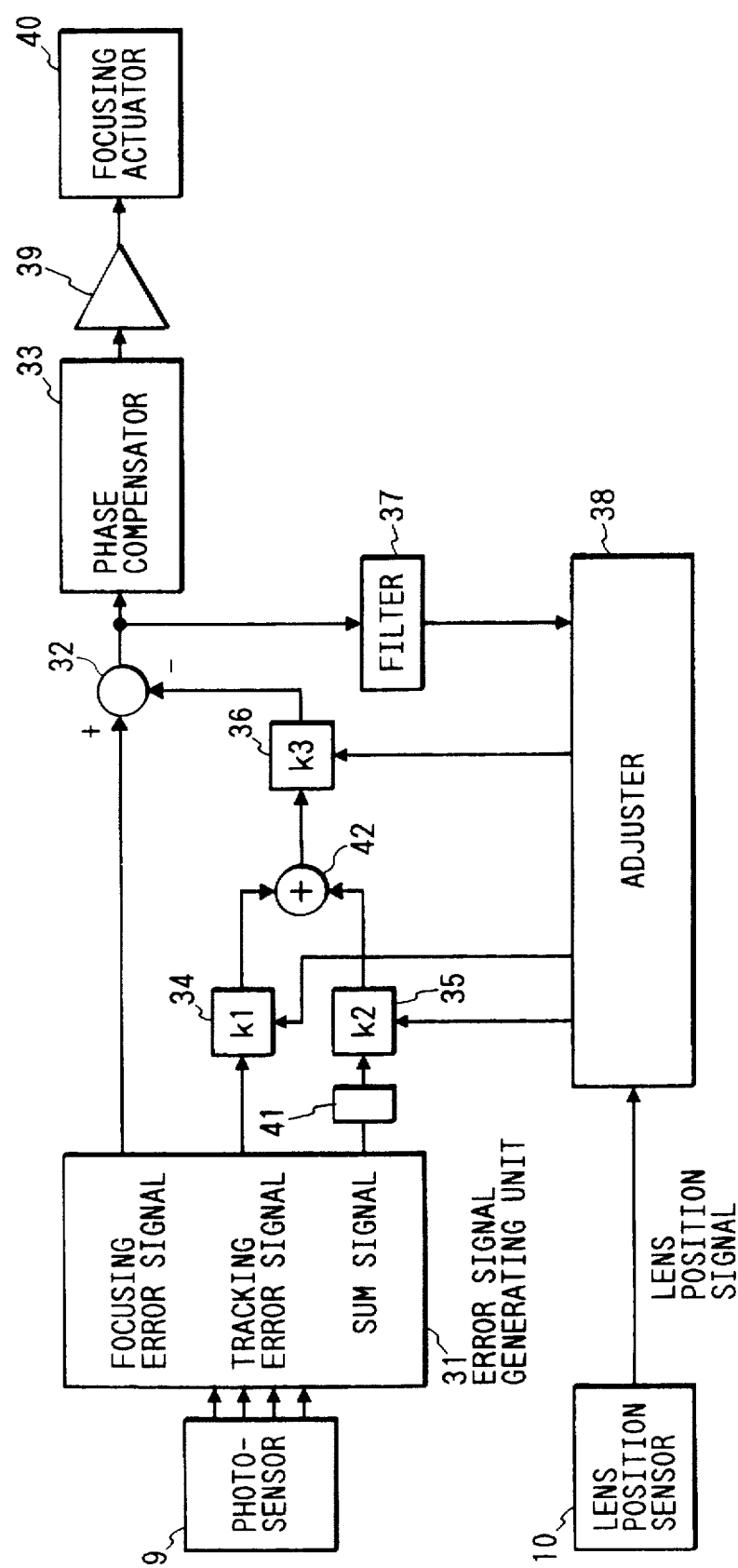
FIG. 8 is a block diagram showing an example of the arrangement position of the DC cut signal for the sum signal.

When such a DC cut unit is assembled in the focusing control circuit, it can be arranged as a DC cut unit 41 between the sum signal output terminal of the error signal generating unit 31 and the multiplier 35, thus cutting the DC component of the sum signal by a simple arrangement, as shown in FIG. 8. However, the arrangement position of the DC cut unit is not limited to this. For example, even when the DC cut unit is arranged at the output side of the multiplier 35, the DC component can be cut by performing a correction of multiplication with k2. When the DC cut unit is arranged at the output side of the multiplier 36, the DC component can be cut by performing a correction of multiplication with k2×k3. In principle, the DC component can be cut at any position in the focusing servo loop.

Figure 9:
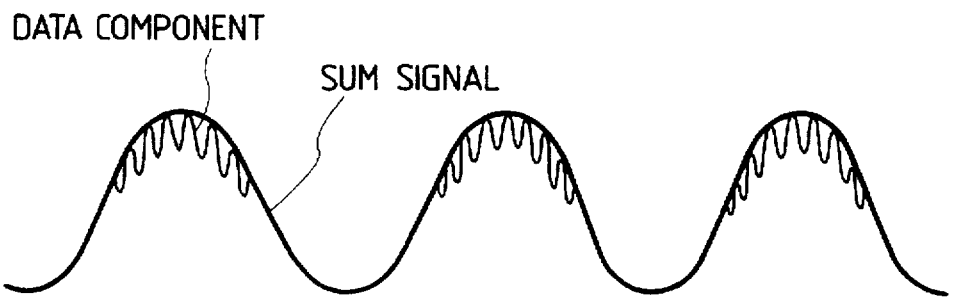
FIG. 9 is a signal waveform chart showing the sum signal obtained when data is recorded on a track when a light beam crosses the track, and high-frequency data components superposed on the sum signal.

Data is often already recorded by information pits on the optical disc 1, and the recorded data is normally a signal from several MHz to several tens of MHz. In such a case, when the light beam crosses tracks on which data has already been recorded, the sum signal includes high-frequency components corresponding to recorded data, as shown in FIG. 9. When the envelope of the sum signal including recorded data components is extracted, a signal almost equivalent to the sum signal (free from the influence of the recorded data) can be obtained. In recent years, an optical disc, called a partial ROM (read only memory) disc, which has both a pit recorded region and a recordable region to be used by a user, is commercially available. Since the pit recorded region cannot be rewritten, it is called a ROM portion.

Figure 10:
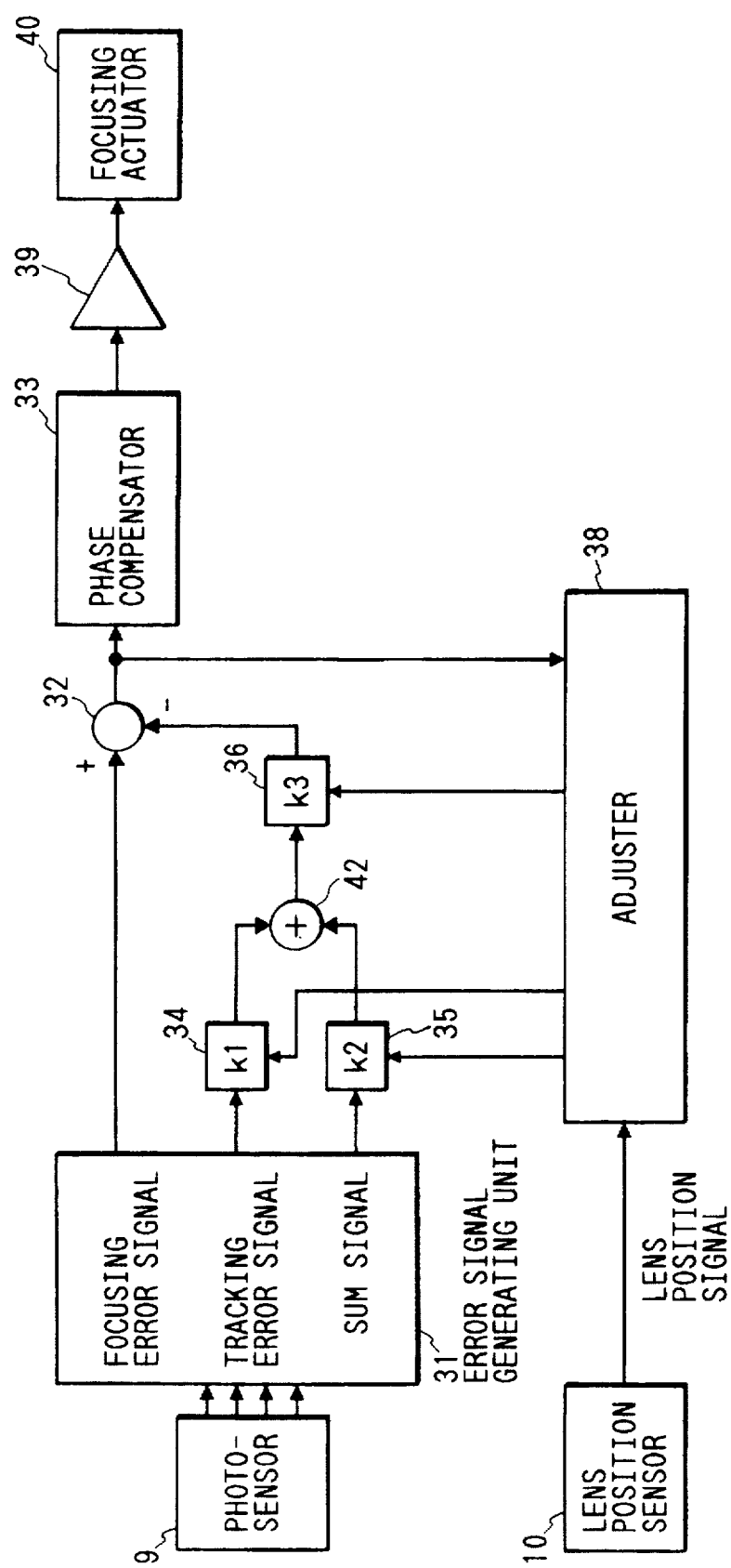
FIG. 10 is a block diagram showing an example from which a filter 37 in the embodiment shown in FIG. 4 is omitted.

When the sum signal is generated from such a partial ROM disc, for example, the presence/absence of recorded data of the ROM portion is detected to discriminate whether a portion to be accessed is present in the ROM portion or the recordable region. If it is determined that the portion to be accessed is present in the ROM portion, the envelope of the sum signal is extracted, as described above. If it is determined that the portion to be accessed is present in the recordable region, the sum signal is directly fetched. In this manner, switching control can be made in correspondence with recording regions. Furthermore, in an apparatus which uses an amplifier with a wide frequency range for amplifying a reproduced signal obtained from the disc, the above-mentioned switching control is not needed, and the envelope of the sum signal can always be detected. In the embodiment shown in FIG. 4, the focusing error signal is detected via the filter 37. However, the filter 37 is not always required, and may be omitted, as shown in FIG. 10.

An embodiment for adjusting the multipliers k1 to k3 in correspondence with the position of the objective lens 7 shown in FIG. 3 will be explained below. More specifically, since the crosstalk amount of the focusing error signal changes depending on the tracking position of the objective lens 7, the multipliers are adjusted in correspondence with the position of the objective lens 7, thereby more precisely canceling crosstalk components. When the position of the objective lens 7 is moved, the adjuster 38 outputs a command signal to a driver (not shown) of the tracking actuator of the tracking servo loop. At this time, the adjuster 38 monitors the output from the lens position sensor 10, and outputs a command signal to move the objective lens 7 to a neutral position and to the right and left to have the neutral position as the center by a predetermined amount. In this manner, the objective lens 7 is controlled to a desired position in the tracking direction, and the adjuster 38 calculates the multipliers k1 to k3 of the multipliers 34 to 36 at each position. More specifically, the adjuster 38 generates a data table of the multipliers k1 to k3 using, as a parameter, the position, in the tracking direction, of the objective lens 7, and stores it in an internal or external memory. Of course, the multipliers k1 to k3 are calculated by the method described above with reference to FIG. 4.

Figures 11, 12:
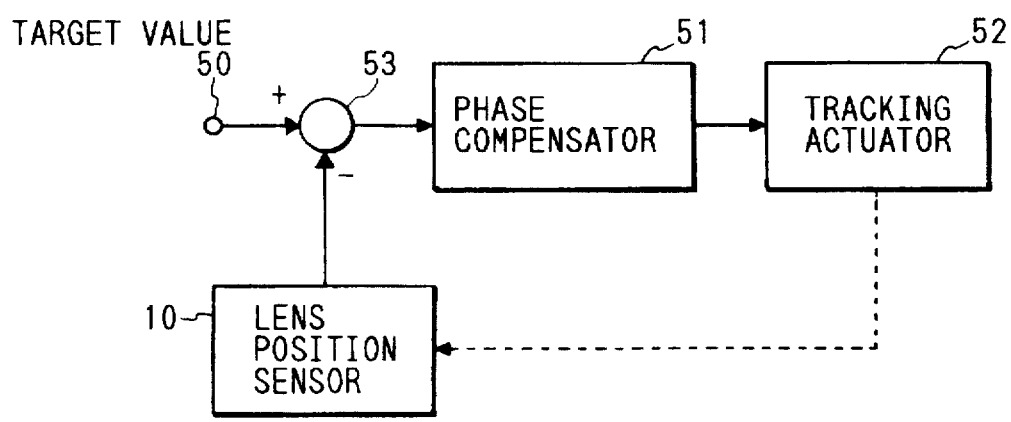
FIG. 11 is a data table of multipliers k1 to k3 using the position of an objective lens as a parameter.
FIG. 12 is a block diagram showing a position control loop for fixing an objective lens 7 at a desired position.

FIG. 11 shows an example of the data table. A lens position L0 corresponds to a neutral position, the lens is moved to the right and left by 10 μm to have the neutral position L0 as the center, and a table of multipliers k1 to k3 at the right and left positions at 10-μm intervals is formed, for example, at the neutral position L0, k1=1.1, k2=0.8, and k3=0.3. At other positions, a table of multipliers k1 to k3 corresponding to the positions of the objective lens 7 is formed. When crosstalk components in the focusing error signal are removed using such a data table, the adjuster 38 monitors the output signal from the lens position sensor 10 to determine which position of multipliers in the data table is to be used. For example, when the lens position sensor 10 detects that the objective lens 7 is located at a position L9 in the data table in FIG. 11, the adjuster 38 reads out the multipliers k1 to k3 from that position, and adjusts the multipliers k1 to k3 of the multipliers 34 to 36 to values corresponding to the position of the objective lens 7. In this manner, during the seek operation of the optical head, the adjuster 38 recognizes the position of the objective lens 7 on the basis of the output signal from the lens position sensor 10, and adjusts the multipliers k1 to k3 to values corresponding to the recognized position, thereby correcting crosstalk components in the focusing error signal.

As described above, in this embodiment, a table of multipliers k1 to k3 is formed in advance using the position of the objective lens 7 as a parameter, and the multipliers k1 to k3 are adjusted in correspondence with the position of the objective lens 7. Thus, even when the position of the objective lens 7 changes during the seek operation of the optical head 3, the multipliers k1 to k3 can be adjusted to values corresponding to the position of the lens. Therefore, crosstalk components in the focusing error signal can be precisely canceled independently of the position, in the tracking direction, of the objective lens 7, and the focusing error signal can be corrected with high precision. In particular, when a track jump operation is performed by driving the objective lens 7 by the tracking actuator, since the position of the objective lens 7 inevitably changes, the multipliers are adjusted in correspondence with the movement of the objective lens 7, thus effectively correcting crosstalk components.

In place of during the seek operation of the optical head 3, the multipliers k1 to k3 can be adjusted using the data table shown in FIG. 11 while the tracking servo upon normal recording/reproduction of information is active. More specifically, even when the light beam scans to follow a track under the tracking servo control, an offset of the light beam from the track due to a tracking error is inevitably generated. For this reason, when the multipliers k1 to k3 are adjusted in correspondence with the position of the objective lens 7, crosstalk correction with high precision can be attained over the entire movable range of the objective lens 7, and high-precision focusing control can be realized.

When the multipliers k1 to k3 are calculated in correspondence with the position of the objective lens 7, as described above, the objective lens 7 must be moved by a small distance. At this time, not only a driving force is applied to the objective lens 7, but also the output from the lens position sensor 10 is fed back to the tracking actuator, thereby driving the objective lens 7 in the tracking direction with high precision. FIG. 12 is a block diagram showing a feedback loop at that time. Referring to FIG. 12, an addition point 53 subtracts the output from the lens position sensor 10 from a target value 50. A phase comparator 51 stabilizes the control loop. A tracking actuator 52 drives the objective lens 7. It can be considered that the lens position sensor 10 is connected to the tracking actuator 52 since it detects the position, in the tracking direction, of the objective lens 7.

Therefore, when the output from the lens position sensor 10 is output to the addition point 53 to feed back the lens position to the target value 50, the position control loop of the objective lens 7 can be constituted. In such a control loop, since the control effects to locate the objective lens 7 at the target position, the objective lens 7 can be precisely fixed at the target position. Therefore, when the multipliers k1 to k3 are calculated in correspondence with the position of the objective lens 7, the target value of the lens position is input to the position control loop shown in FIG. 12 and is changed by, e.g., 10 μm, 20 μm, and so on, and the multipliers k1 to k3 are calculated each time the target value is changed, thus easily forming the data table shown in FIG. 11. In addition, since the objective lens 7 can be precisely fixed at a desired position, precise multipliers k1 to k3 corresponding to the position of the objective lens 7 can be obtained, and the focusing error signal can be precisely corrected.

When the focusing servo loop is ON, it is often difficult to practically observe crosstalk components in the focusing error signal depending on the characteristics of the servo loop. More specifically, the in-focus point of the light beam undesirably follows the focusing error signal including crosstalk components under the control of the focusing servo loop, and crosstalk components cannot be observed. Normally, since the focusing servo loop has a large gain at the low-frequency side and has a small gain at the high-frequency side, the in-focus point completely follows crosstalk components especially at the low-frequency side. For this reason, crosstalk components cannot be observed, and the adjustment of the multipliers k1 to k3 is disturbed.

Such a problem can be solved by increasing the track crossing frequency. More specifically, the light beam is caused to cross tracks in a high-frequency range corresponding to a small gain of the focusing servo loop, and the multipliers are adjusted in a frequency range in which the servo loop does not respond. Normally, since the frequency range of the focusing servo loop is set to be 1 to 5 kHz, a track crossing frequency higher than the upper limit of this range need only be obtained. In most cases, since the track crossing frequency due to the eccentricity of the optical disc 1 is 5 to 10 kHz, adjustment of the multipliers can be normally attained by the eccentricity of the optical disc 1. However, since the track crossing frequency is often lowered depending on the amount of eccentricity, the track crossing frequency must be increased by some means in such a case.

In order to increase the track crossing frequency, for example, a method of utilizing the position control loop of the objective lens 7 shown in FIG. 12 is available. More specifically, in the position control loop shown in FIG. 12, since the objective lens 7 is displaced to follow the target value if the target value is changed, a required track crossing frequency can be obtained by changing the target value at a desired frequency. However, increasing the track crossing frequency by largely oscillating the objective lens 7 contradicts to the adjustment of the multipliers using the position of the objective lens 7 as a parameter, as described above, and it is desirable to increase the track crossing frequency with a small displacement of the objective lens 7. For example, in order to obtain a maximum track crossing frequency of 10 kHz within a range of ±10 μm, the objective lens 7 can be oscillated at 250 Hz. More specifically, as a target value, a sine wave of ±10 μm and 250 Hz can be applied. Note that the target value at that time is obtained when the track pitch=1.6 μm.

When the objective lens 7 is oscillated in a sine wave pattern, it stops near maximum and minimum points of its amplitude, and the track crossing frequency becomes low at these points. On the other hand, when the objective lens 7 is oscillated in a sine wave pattern, na maximum track crossing frequency is obtained at the center of the oscillated range (a point where the displacement from the center of the amplitude of the sine wave is 0). By utilizing this characteristics, crosstalk components are preferably detected in a time band with a relatively high track crossing frequency of a time interval from the maximum point of the sine wave to zero and a time interval from zero to the minimum point of the sine wave. In this case, when the objective lens 7 is driven by a signal of ±30 μm and 80 Hz, crosstalk components can be measured at the timings of the amplitude value=±10 μm. Furthermore, when the eccentricity of the optical disc 1 is measured, and an appropriate target value is set in correspondence with the measured eccentricity, a stable track crossing frequency can be obtained. In order to increase the track crossing frequency, a method of utilizing a track jump operation, and a method of driving the optical head 3 itself are also available.

Figure 13A:
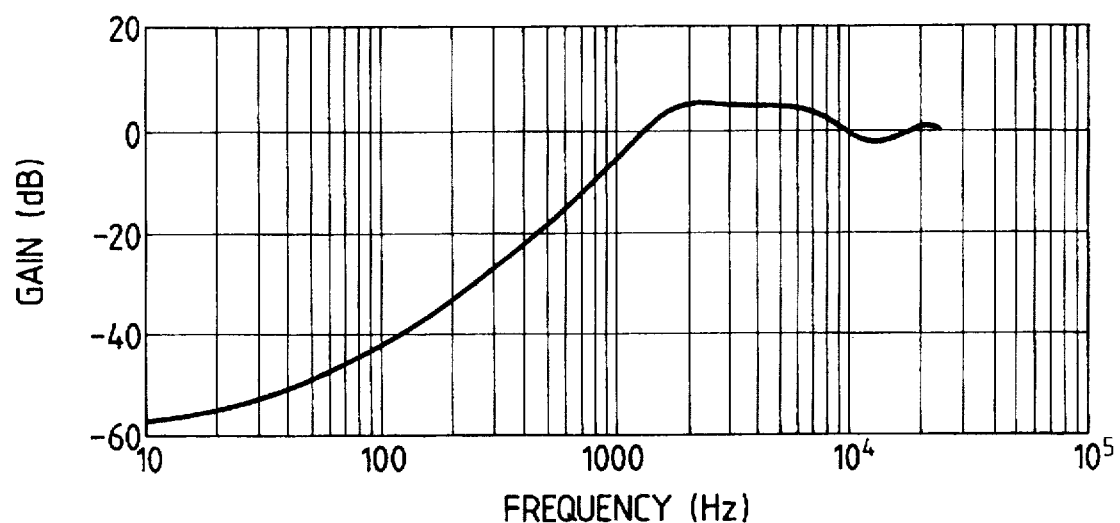
FIGS. 13A and 13B are graphs showing the frequency characteristics of a focusing error signal with respect to crosstalk components of the focusing servo loop shown in FIG. 4.
Figure 13B:
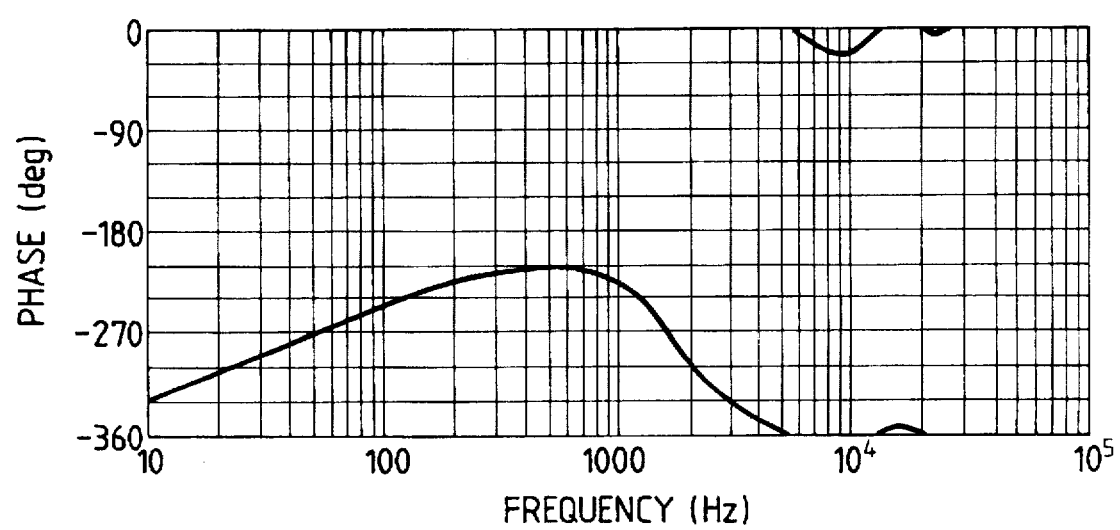

The filter 37 shown in FIG. 4 will be described below. In the above description, it is difficult to observe crosstalk components in a low-frequency range in the focusing servo loop, and in order to solve this problem, the track crossing frequency is preferably increased. As another method, the filter 37 having characteristics for compensating for this may be arranged. FIGS. 13A and 13B show the frequency characteristics of the focusing error signal with respect to crosstalk components upon crossing of tracks in the focusing servo loop shown in FIG. 4. FIG. 13A shows the frequency characteristics of the gain, and FIG. 13B shows the frequency characteristics of the phase. These figures show the frequency characteristics obtained when the focusing servo frequency range is about 2 kHz. As can be seen from FIGS. 13A and 13B, the frequency component becomes small at 2 kHz or less.

Figure 14A:
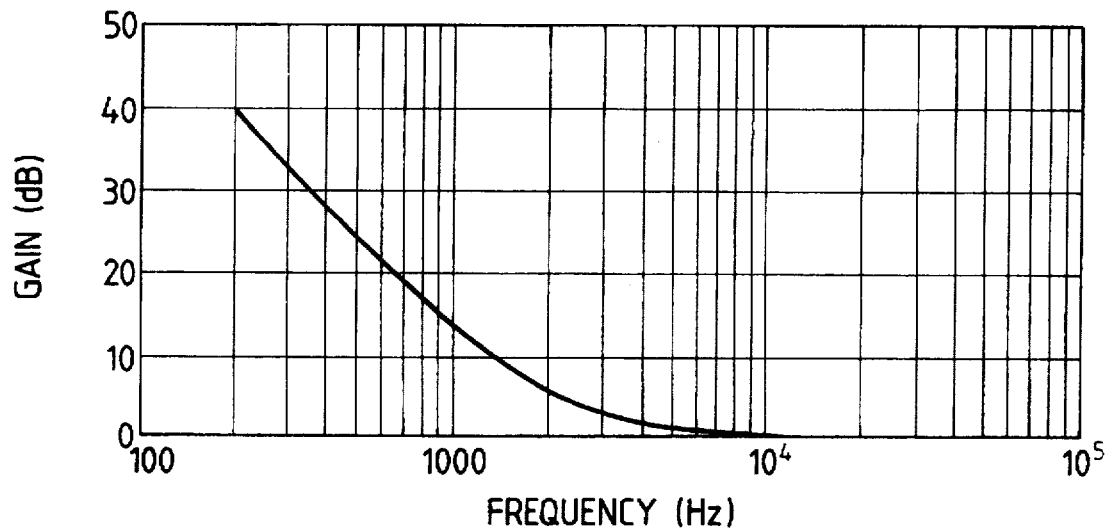
FIGS. 14A and 14B are graphs showing the characteristics of a filter 37 for compensating for the frequency characteristics of the focusing servo loop.
Figure 14B:
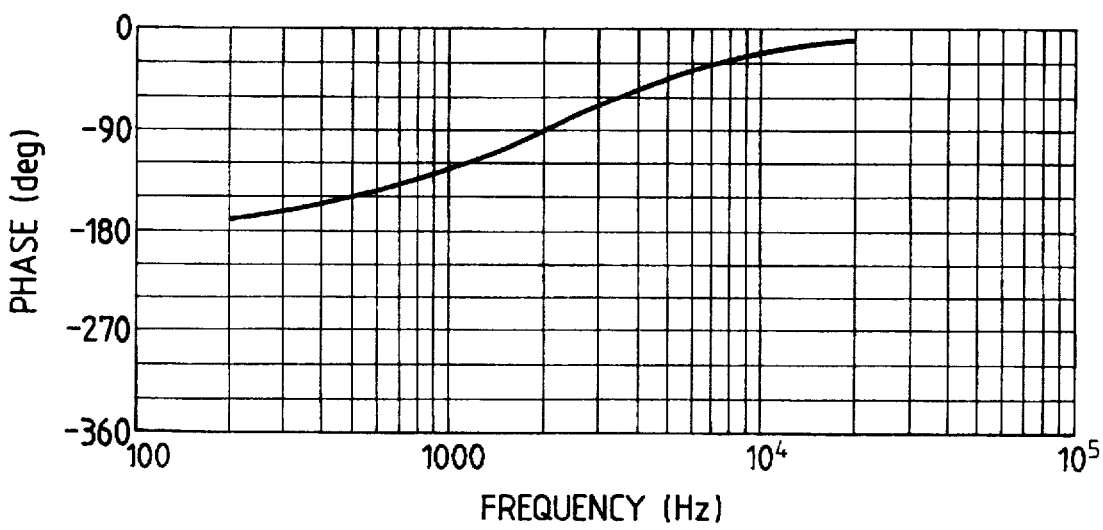

In order to compensate for the above frequency characteristics, the filter 37 shown in FIG. 4 can be provided with characteristics for compensating for the frequency characteristics. For example, when the characteristics shown in FIGS. 14A and 14B are provided to the filter 37, even crosstalk components in the focusing servo frequency range can be observed, and the adjustment of multipliers can be performed without posing any problems. FIG. 14A shows the frequency characteristics of the gain, and FIG. 14B shows the frequency characteristics of the phase. This filter has quadratic integration characteristics up to about 2 kHz, and has flat characteristics at 2 kHz or higher.

Figure 15A:
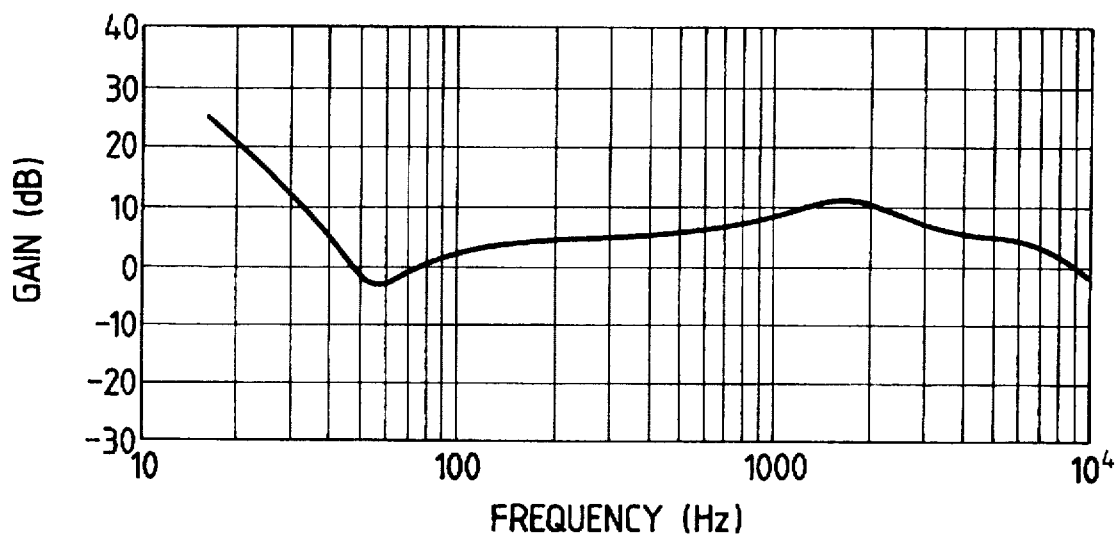
FIGS. 15A and 15B are graphs showing the frequency characteristics of the output from the filter 37 with respect to crosstalk components when the filter 37 has the characteristics shown in FIGS. 14A and 14B.
Figure 15B:
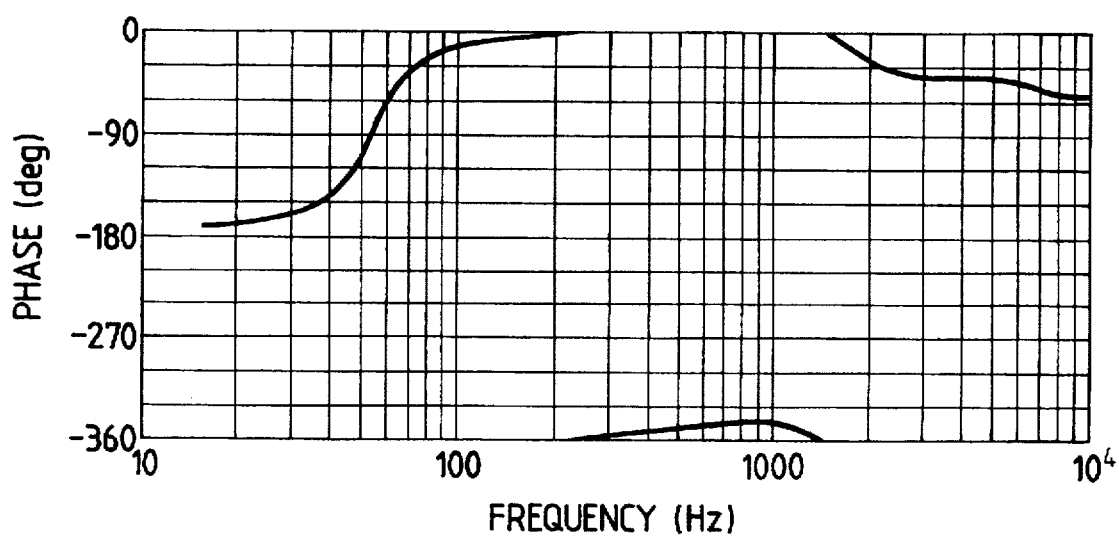

FIGS. 15A and 15B show the frequency characteristics of the output from the filter 37 with respect to crosstalk components when the filter 37 has the characteristics shown in FIGS. 14A and 14B. FIG. 15A shows the frequency characteristics of the gain, and FIG. 15B shows the frequency characteristics of the phase. As can be seen from FIGS. 15A and 15B, almost flat characteristics can be obtained within a range from 60 Hz to about 10 kHz. Therefore, when the filter 37 with the characteristics shown in FIGS. 14A and 14B is arranged, the frequency characteristics shown in FIGS. 13A and 13B can be effectively compensated for, and crosstalk components can be observed over a wide frequency range. As a result, the multipliers can be adjusted independently of the frequency characteristics of the focusing servo loop.

Figure 16A:
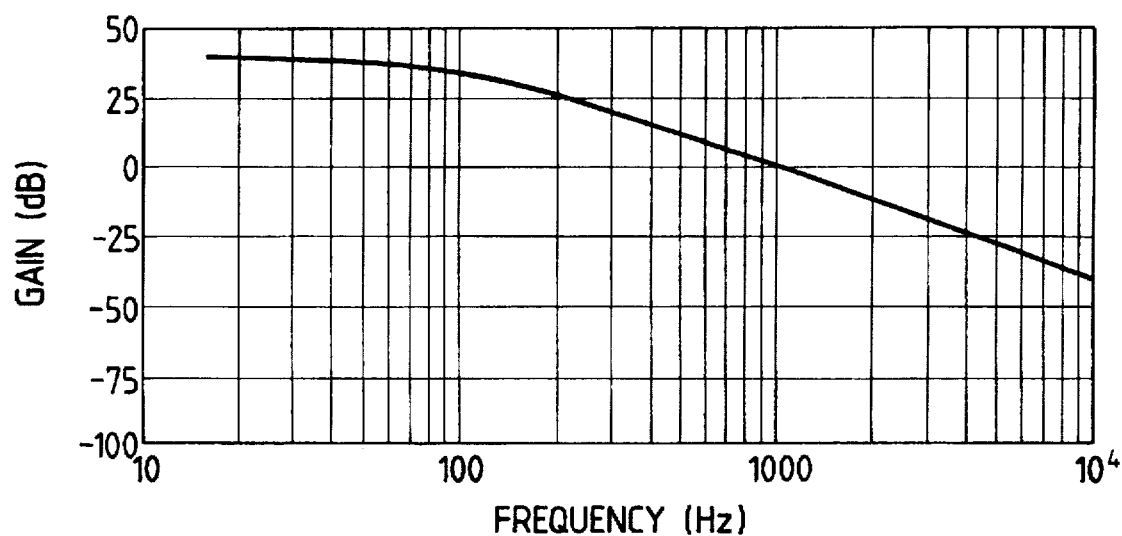
FIGS. 16A and 16B are graphs showing other characteristics of the filter 37.
Figure 16B:
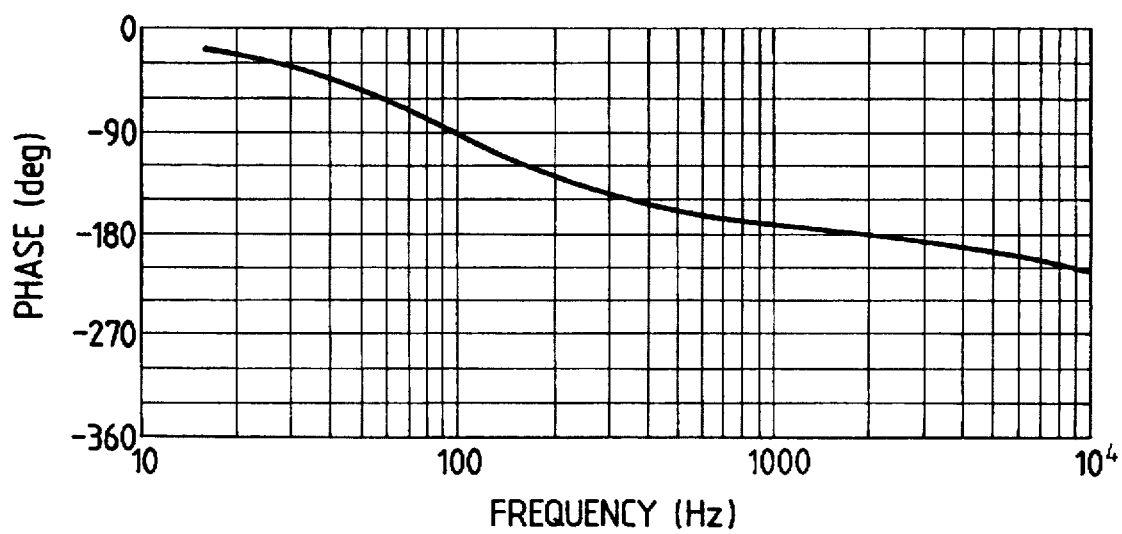
Figure 17A:
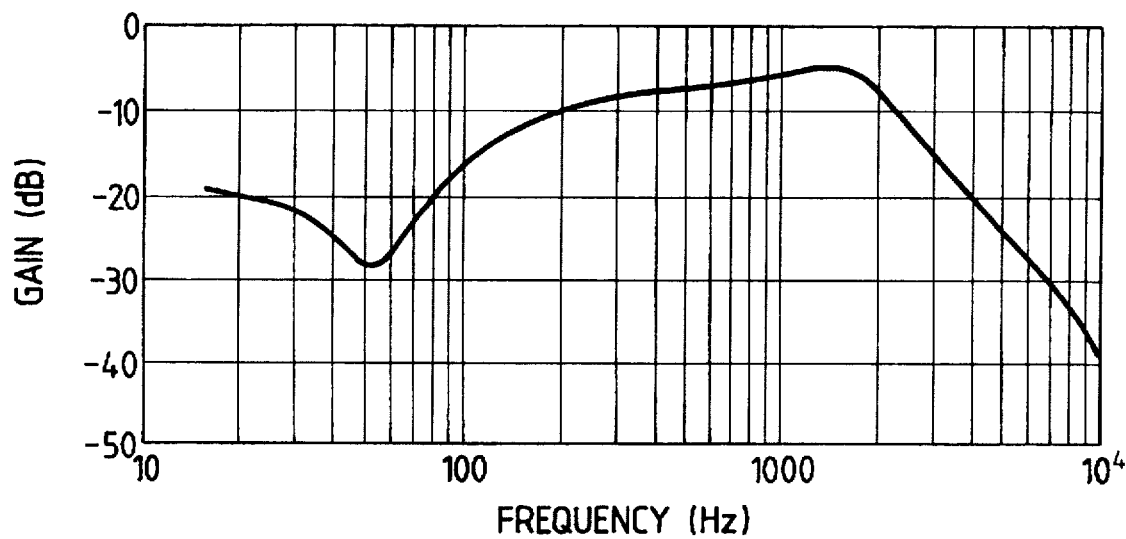
FIGS. 17A and 17B are graphs showing the frequency characteristics of the output from the filter 37 with respect to crosstalk components when the filter 37 has the characteristics shown in FIGS. 16A and 16B.
Figure 17B:
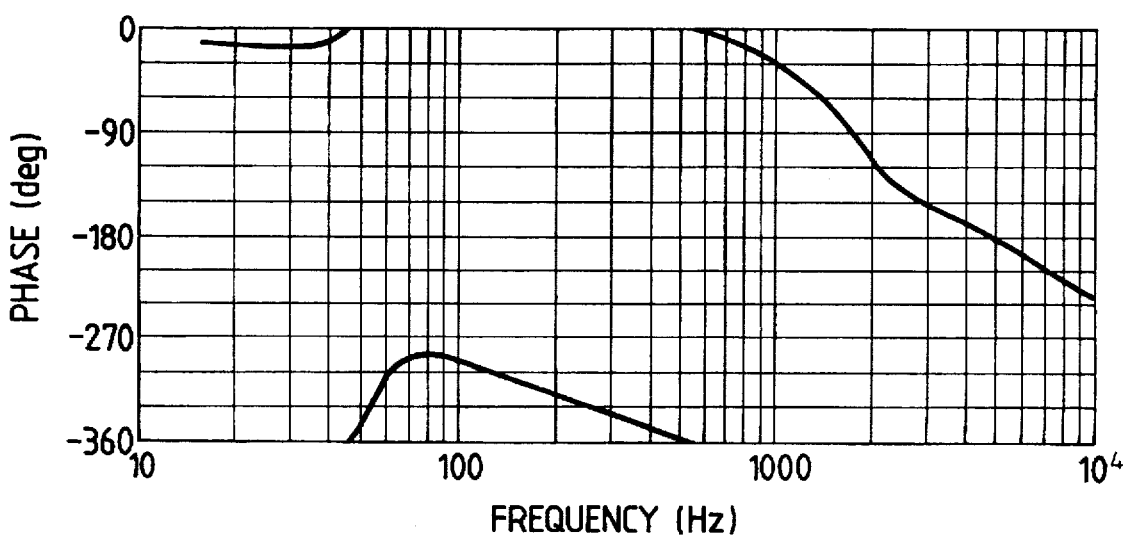

FIGS. 16A and 16B show another example of the frequency characteristics of the filter 37. FIG. 16A shows the frequency characteristics of the gain, and FIG. 16B shows the frequency characteristics of the phase. FIGS. 16A and 16B exemplify a low-pass filter having a second-order pole at 100 Hz. FIGS. 17A and 17B show the frequency characteristics of the output from the filter 37 with respect to crosstalk components when the filter 37 has the characteristics shown in FIGS. 16A and 16B. FIG. 17A shows the frequency characteristics of the gain, and FIG. 17B shows the frequency characteristics of the phase. As can be seen from FIGS. 17A and 17B, relatively flat characteristics can be obtained within a range from 10 Hz to 2 kHz. Therefore, even the filter 37 with the characteristics shown in FIGS. 16A and 16B is effective for observation of crosstalk components. As the characteristics of the filter 37, the characteristics shown in FIGS. 14A and 14B and FIGS. 16A and 16B are exemplified. However, when the order or precision of the filter is increased, still flatter characteristics can be obtained. When the observation precision of crosstalk component need not be so high, a simpler filter, e.g., a first-order low-pass filter may be arranged.

The crosstalk amount in the focusing error signal varies more or less depending on the positions even in a single optical disc. When this variation is large, an error is generated in crosstalk correction. In particular, in the case of a partial ROM disc, since the ROM portion and the recordable region have considerably different crosstalk characteristics, a large error may be generated in crosstalk correction. In such a case, the above-mentioned multipliers k1 to k3 for crosstalk correction may be calculated at a plurality of radial positions of the optical disc, and may be stored as a table in a memory. Of course, a table corresponding to the position of the objective lens 7 is preferably stored together. As the plurality of radial positions of the optical disc, for example, two points, i.e., the inner and outer peripheral positions of the disc may be used, or three points, i.e., inner, middle, and outer peripheral positions may be used. Furthermore, the radius may be equally divided into eight sections, and the multipliers k1 to k3 may be calculated at the respective positions.

Therefore, when the optical head seeks, the position of the optical head is sequentially detected, and the multipliers k1 to k3 are adjusted to values corresponding to the detected position, thereby correcting a variation in crosstalk amount depending on the position on the optical disc, and correcting a crosstalk amount with high precision over the entire surface of the optical disc. At a position between two adjacent ones of a plurality of radial positions, i.e., at a radial position other than the positions where the multipliers for crosstalk correction are calculated, multipliers at a position closest to the position of interest may be used, or the multipliers may be interpolated by linear approximation or quadratic approximation, thus allowing crosstalk correction with higher precision. In the case of the partial ROM disc, since the ROM portion and the recordable region have different crosstalk characteristics, the multipliers k1 to k3 can be calculated in correspondence with the ROM portion and the recordable region, and can be stored as tables, thus allowing precise crosstalk correction independently of regions.

FIG. 18 is a block diagram showing the second embodiment of the present invention. In this embodiment, the multiplier 35 in the first embodiment shown in FIG. 4 is omitted to simplify the arrangement. The arrangement of this embodiment is substantially the same as that of the embodiment shown in FIG. 4, except that the multiplier 35 is omitted. In the embodiment shown in FIG. 4, if the amplitude of the tracking error signal is represented by t, and the amplitude of the sum signal is represented by w, an output x from the multiplier 35 is given by:

$$x = (k1 \cdot t + k2 \cdot w) \cdot k3 \quad (3)$$
$$= k1 \cdot k3 \cdot t + k2 \cdot k3 \cdot w$$

However, in this embodiment, the arrangement is simplified using the multiplier k2 of the multiplier 35 as a constant. More specifically, since the amplitude w of the sum signal can be adjusted by the multiplier k3 of the multiplier 36, the multiplier 36 is also used for adjusting the amplitude of the sum signal.

The detailed adjustment method of this embodiment will be explained below. The adjuster 38 changes the multiplier k1 of the multiplier 34 to change the phase of the correction signal output from the multiplier 36. At this time, the adjuster 38 searches for a multiplier k1 of the multiplier 34 corresponding to the minimum output amplitude of the correction addition point 32 while monitoring the output amplitude of the correction addition point 32 via the filter 37. More specifically, since the phase of crosstalk components in the focusing error signal coincides with that of the correction signal when the output amplitude of the correction addition point 32 becomes minimum, the adjuster 38 detects a multiplier k1 of the multiplier 34 obtained when the output amplitude of the correction addition point 32 becomes minimum.

As a method of changing the multiplier k1, the following method is available. That is, as in the fourth embodiment, for example, 100 multipliers k1 are programmed, and are sequentially changed. Then, a multiplier k1 corresponding to the minimum output amplitude of the correction addition point 32 is detected, and the multiplier k1 of the multiplier can be adjusted to the detected value. As has been described above with reference to FIG. 4, the multiplier k1 may be initially changed by a coarse step to detect a multiplier k1 obtained when the output amplitude of the correction addition point 32 becomes substantially minimum. Thereafter, the multiplier k1 may be changed by a fine step to detect a multiplier k1 obtained when the output amplitude of the correction addition point 32 becomes precisely minimum. Furthermore, if the amplitude of the correction addition point 32 increases when the multiplier k1 is increased, a multiplier k1 corresponding to the minimum point is smaller than a current value. For this reason, the multiplier k1 is decreased, and if the output amplitude decreases upon the decrease in multiplier, the multiplier k1 is further decreased to finally detect a multiplier k1 obtained when the output amplitude of the correction addition point 32 becomes minimum.

In this manner, the adjustment of the multiplier k1 is completed, and the phases of the correction signal and crosstalk component match each other. Thereafter, the adjustment of the multiplier k3 is performed. When the multiplier k3 is to be adjusted, the adjuster 38 searches for a multiplier k3 corresponding to the minimum output amplitude of the correction addition point 32 by changing the multiplier k3. When a multiplier k3 corresponding to the minimum output amplitude of the correction addition point 32 is detected, the multiplier k3 is adjusted to the detected value to perform crosstalk correction. As a method of changing the multiplier k3, the following methods are available. In one method, for example, 100 multipliers k3 are programmed, and are sequentially changed as in the adjustment of the multiplier k1. In the other method, the multiplier k3 is initially changed by a coarse step, and thereafter, is changed by a fine step.

Also, as described above, the multiplier k3 may be changed in correspondence with an increase/decrease in output amplitude of the correction addition point 32. In this manner, the adjustment of the multipliers k1 and k3 is completed, and crosstalk components included in the focusing error signal obtained when the light beam crosses tracks can be effectively canceled.

Figure 19:
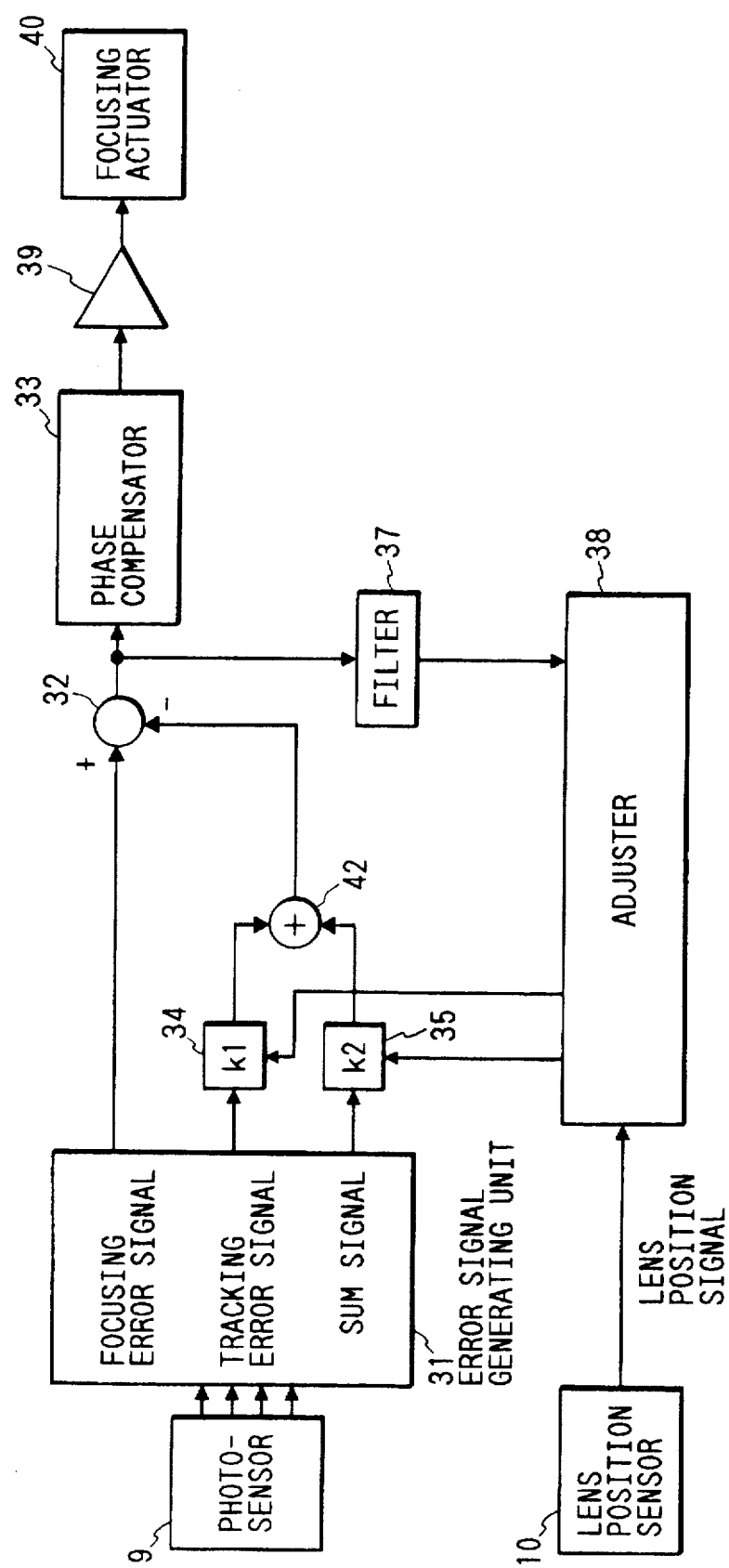
FIG. 19 is a block diagram showing an example from which a multiplier 36 in the embodiment shown in FIG. 18 is omitted.

In the embodiment shown in FIG. 18, the multiplier 35 is omitted. However, the multiplier 34 may be omitted in place of the multiplier 35. In this case, a multiplier k2 corresponding to the minimum output amplitude of the correction addition point 32 is detected by changing the multiplier k2 as in the above embodiment, and the multiplier k2 can be adjusted to the detected value. On the other hand, as shown in FIG. 19, the multiplier 36 may be omitted in place of omitting the multiplier 34 or 35. In the embodiment shown in FIG. 19, since an adjustment function equivalent to that of the multiplier k3 can be obtained by changing the multipliers k1 and k2 at the same ratio after the multipliers k1 and k2 are adjusted, the adjustment function of the multiplier k3 of the multiplier 36 is commonly achieved by the multipliers 34 and 35. Therefore, in FIG. 19, after the multipliers k1 and k2 are adjusted, the multipliers k1 and k2 can be changed at the same ratio to be adjusted to those obtained when the output amplitude of the correction addition point 32 becomes a minimum again.

In this manner, by omitting the multiplier 34, 35, or 36, the hardware arrangement can be simplified, or when the above-mentioned processing is realized in a software manner, the processing can be simplified. In the second embodiment as well, by repetitively adjusting the multipliers k1 to k3 a plurality of number of times, crosstalk correction precision can be further improved. Also, a data table may be formed in correspondence with the position of the objective lens 7, or a data table may be formed in correspondence with the radial position on the optical disc. Furthermore, in the case of a partial ROM disc, a data table may be formed in correspondence with the ROM portion and the recordable region. In this manner, by adjusting the multipliers in correspondence with the position of the objective lens 7, the radial position on the optical disc, or a difference between the ROM and recordable regions, crosstalk correction precision can be further improved.

Figure 20:
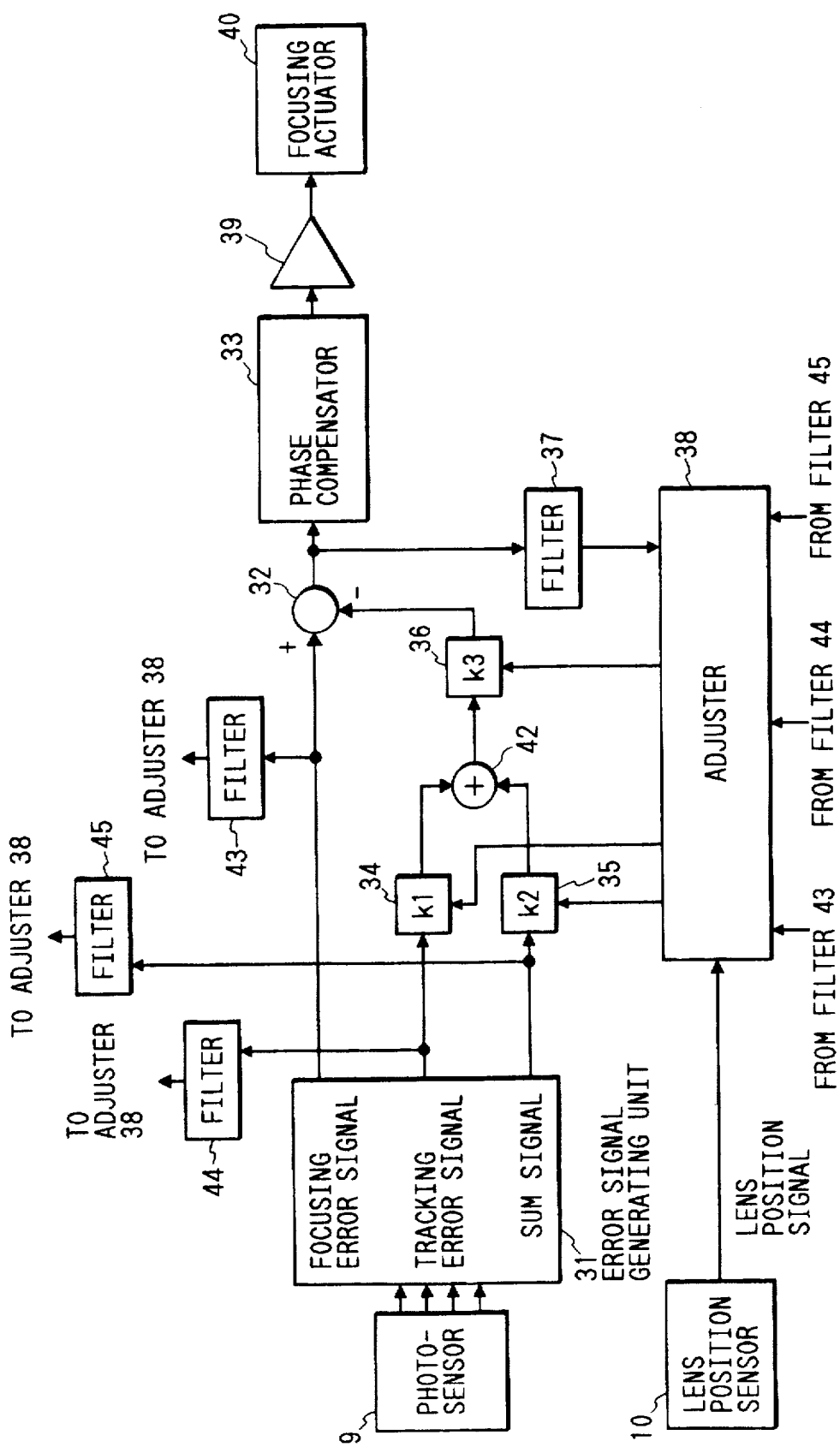
FIG. 20 is a block diagram showing the third embodiment of the present invention.

FIG. 20 is a block diagram showing the third embodiment of the present invention. In this embodiment, a focusing error signal output from the error signal generating unit 31 is output to the adjuster 38 via a filter 43, and a tracking error signal and a sum signal are also output to the adjuster 38 via filters 44 and 45, respectively. The filters 43 to 45 are basically not necessary, and the above-mentioned signals may be directly output to the adjuster 38, or a simply low-pass filter may be used. The adjuster 38 detects the error signals and the sum signal obtained when a light beam from the optical head crosses tracks, and adjusts the multipliers k1 to k3 of the multipliers 34 to 36 on the basis of these signals. Of course, the adjustment of the multipliers is performed when the apparatus is activated or when the optical disc 1 is exchanged. In this embodiment as well, when the light beam crosses tracks, if the track crossing frequency is low, the track crossing frequency is preferably increased by utilizing the above-mentioned position control loop of the objective lens 7.

Upon adjustment of the multipliers k1 to k3 of the multipliers 34 to 36, the adjuster 38 adjusts the multiplier k3 of the multiplier 36 to be zero, i.e., performs initialization so as not to apply a correction signal to the correction addition point 32. In this state, the adjuster 38 detects the focusing error signal, the tracking error signal, and the sum signal upon crossing of tracks via the corresponding filters.

At this time, the adjuster 38 detects the signal waveforms of the respective signals obtained when the light beam crosses one track pitch, and stores them in an internal memory. In order to improve the reliability of signal data, an average value of data for a plurality of pitches can be used. Then, the adjuster 38 executes processing for calculating the multipliers of the multipliers 34 to 36 on the basis of the relationship among crosstalk components upon crossing of tracks included in the focusing error signal, the tracking error signal, and the sum signal. More specifically, the adjuster 38 calculates the multipliers k1 to k3 from the following equation:

$$\text{Crosstalk} = k3 \cdot (k1 \cdot \text{tracking error signal} + k2 \cdot \text{sum signal}) \quad (4)$$

Note that many methods of calculating the multipliers k1 to k3 are available, and an example of these methods will be described below. The adjuster 38 detects the phase of crosstalk components in the focusing error signal. The reference point of this phase may be the start point of data for one track pitch, which data is developed on a memory. In the following description, the tracking error signal is used as the reference point of the phase, for the sake of simplicity. At this time, assume that the phase of crosstalk components is 15°. In addition, the phase of the sum signal is shifted by about 90° from that of the tracking error signal, as described above. If the amplitude of the detected tracking error signal is represented by $a_1$, the amplitude of the sum signal is represented by $a_2$, and a variable in the track crossing direction is represented by x, the following relations are established:

$$\text{Tracking error signal} = a_1 \cdot \sin(x) \quad (5)$$

$$\text{Sum signal} = a_2 \cdot \cos(x) \quad (6)$$

Thus, the ratio between the multiplier k1 and k2 is calculated by multiplying equations (5) and (6) with the multipliers k1 and k2, so that a correction signal becomes a sine wave which is in-phase with crosstalk components. That is, since tan(phase of crosstalk; 15°)=$(k1 \cdot a_1)/(k2 \cdot a_2)$ (7)

then, the ratio between the multipliers k1 and k2 is given by:

$$k1/k2 = \tan(15°) \times (a_2/a_1) \quad (8)$$

Therefore, if the multiplier k1 is assumed to be 1, the multiplier k2 can be determined.

Then, the multiplier k3 is calculated based on the amplitude of crosstalk components. If the amplitude of crosstalk components is represented by C, the input amplitude to the multiplier 36 is given by the following equation from the multipliers k1 and k2:

$$\text{Input amplitude} = \{(k1 \cdot a_1)^2 + (k2 \cdot a_2)^2\}^{1/2} \quad (9)$$

Therefore, from equation (9), the multiplier k3 can be calculated by:

$$k3 = C/\{(k1 \cdot a_1)^2 + (k2 \cdot a_2)^2\}^{1/2} \quad (10)$$

In this manner, the calculations of the multipliers k1 to k3 are completed, and the adjuster 38 adjusts the multipliers k1 to k3 of the multipliers 34 to 36 to the calculated values, thus ending all the adjustment processing operations.

In this embodiment, crosstalk components included in the focusing error signal can be effectively canceled in the same manner as in the above embodiments, the focusing servo loop in the seek operation can be stabilized, and the focusing servo upon execution of the tracking control can be controlled with high precision. In this embodiment, the focusing error signal, the tracking error signal, and the sum signal are detected, and the multipliers k1 to k3 are analytically adjusted by calculating them based on these signals. For this reason, the adjustment time can be shortened as compared to the first and second embodiments.

In this embodiment as well, it is preferable that the multipliers be calculated in correspondence with the position of the objective lens 7 or the position on the optical disc 1, and be stored as a table in a memory. In the case of a partial ROM disc, it is preferable that the multipliers be calculated in correspondence with a difference between the ROM portion and the recordable region, and be stored as a table.

In the embodiment shown in FIG. 20, the three multipliers 34 to 36 are arranged. In this embodiment as well, as has been described above with reference to FIGS. 18 and 19, one of the multipliers 34 to 36 can be omitted. An example wherein the multiplier 36 is omitted will be explained below. When the multiplier 36 is omitted, since the multiplier k3 cannot be set to be zero, the multipliers k1 and k2 of the multipliers 34 and 35 are set to be zero to set the correction signal to be zero. In this state, the adjuster 38 similarly detects the tracking error signal and the sum signal obtained when the light beam crosses tracks, and stores data for one track pitch of the respective signals in the memory. If the amplitude of crosstalk components is represented by C, the following relation is established:

$$C = \{(k1 \cdot a_1)^2 + (k2 \cdot a_2)\}^{1/2} \quad (11)$$

Thus, the multipliers k1 and k2 are calculated from this equation (11) and equation (8) above, and are adjusted to the calculated values.

As for the filters 43 to 45 shown in FIG. 20, if filters which have frequency characteristics corresponding to the characteristics of the focusing servo loop or the amplitude characteristics upon crossing of tracks are used, the detection precision of the respective signals can be improved. In particular, as for the filter 43 which fetches the focusing error signal, if a filter having the characteristics shown in FIGS. 14A and 14B or FIGS. 16A and 16B is used as in the filter 37, the signal can be detected in a wide frequency range upon crossing of tracks. Even when one multiplier is omitted, the multipliers can be stored as a table in correspondence with the position of the objective lens 7, the position on the optical disc 1, or a difference between the ROM portion and the recordable region in the case of a partial ROM disc, as a matter of course.

FIG. 21 is a block diagram showing the fourth embodiment of the present invention. Referring to FIG. 21, a comparator 46 binarizes a sum signal generated by the error signal generating unit 31. The threshold level of the comparator 46 is set to be middle value of the amplitude of the sum signal, and upon crossing of tracks, the binary signal of the sum signal is output to the adjuster 38. The binary signal of the sum signal becomes a signal which changes between 1 and 0 in correspondence with a groove portion and a non-groove portion of the track. A focusing error signal and a tracking error signal are respectively output to the adjuster 38 via the filters 43 and 44. The adjuster 38 forms a data table by causing the binary signal of the sum signal and the tracking error signal to correspond to crosstalk components when the apparatus is started or when the optical disc 1 is exchanged. In a normal operation, the adjuster 38 performs crosstalk correction by looking up the data table. Therefore, this embodiment does not use the multipliers 34 to 36 since an arrangement for correcting crosstalk by calculating multipliers is not adopted. Other arrangements of this embodiment are the same as those in FIG. 4.

Figure 22A:
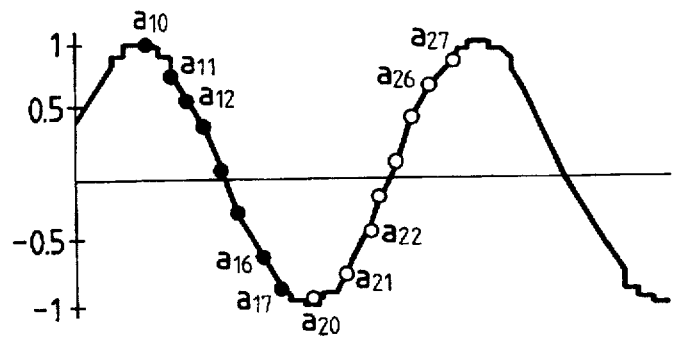
FIGS. 22A to 22C are signal waveform charts respectively showing a tracking error signal detected for generating a table in the embodiment shown in FIG. 21, a sum signal and its binary signal, and crosstalk components in the focusing error signal.
Figure 22B:
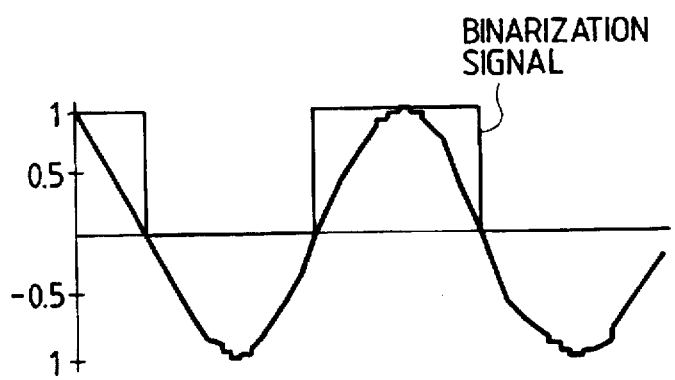
Figure 22C:
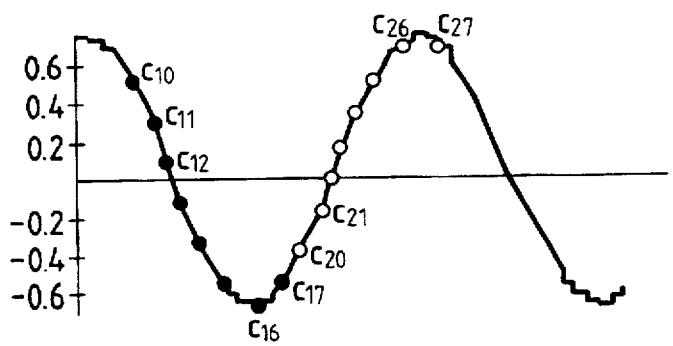

The detailed operation of the fourth embodiment shown in FIG. 21 will be described below with reference to FIGS. 22A to 22C. FIG. 22A shows the tracking error signal obtained when the light beam crosses tracks, and FIG. 22B shows the sum signal. FIG. 22B also shows the binary signal of the sum signal, which is output from the comparator 46. This binary signal changes to low level and high level. In a normal logic circuit, low level corresponds to 0 V, and high level corresponds to 5 V. The tracking error signal and the sum signal have a phase difference of about 90° therebetween, and the tracking error signal becomes a signal which is uniquely determined like $a_{10}$ to $a_{17}$ in FIG. 22A when the binary signal is at low level. On the other hand, when the binary signal is at high level, the tracking error signal similarly becomes a signal which is uniquely determined like $a_{21}$ to $a_{27}$ in FIG. 22A. FIG. 22C shows crosstalk components in the focusing error signal. Of course, in this embodiment, the track crossing frequency of the light beam is increased, as in the above embodiments.

When the light beam crosses tracks, the respective signals change, as shown in FIGS. 22A to 22C. The adjuster 38 fetches these signals upon crossing of tracks, and forms a data table for crosstalk correction on the basis of these signals. The tracking error signal and crosstalk components in the focusing error signal are fetched after they are converted into digital signals by a D/A converter in the adjuster 38. When the data table for crosstalk correction is formed, the adjuster 38 forms data tables in correspondence with low level and high level of the binary signal of the sum signal, and by causing the crosstalk level to correspond to the tracking error signal level.

More specifically, when the binary signal of the sum signal is at low level, since the crosstalk level is $c_{10}$, as shown in FIG. 22C, when the tracking error signal level is $a_{10}$, as shown in FIG. 22A, the crosstalk level $c_{10}$ is stored in a memory in correspondence with the tracking error signal level $a_{10}$. The memory may be either an internal memory of the adjuster 38 or an external memory. Similarly, the adjuster 38 forms a data table by causing the crosstalk levels to correspond to the tracking error signal levels (e.g., the crosstalk level $c_{11}$ is caused to correspond to the tracking error signal level $a_{11}$; $c_{12}$ to $a_{12}$; $c_{13}$ to $a_{13}$; and so on).

On the other hand, when the binary signal is at high level, since the crosstalk level $c_{20}$ corresponds to the tracking error signal level $a_{20}$, $c_{20}$ is stored in the memory in correspondence with $a_{20}$. Similarly, a data table is formed by causing the crosstalk levels to correspond to the tracking error signal levels (e.g., the crosstalk level $c_{21}$ is caused to correspond to the tracking error signal level $a_{21}$; $c_{22}$ to $a_{22}$; $c_{23}$ to $a_{23}$; and so on). In FIGS. 22A to 22C, when the binary signal is at low level and high level, since the number of sampling points of each of the tracking error signal and crosstalk components is 8, data tables in units of 8 points are formed. In this case, the number of points can be arbitrarily set in accordance with a required crosstalk correction precision or a limitation on the memory capacity. In an actual application, a data table is preferably formed in units of levels obtained by equally dividing the level of the tracking error signal, e.g., in units of 0.1 V if the amplitude level is 1 V.

The operation for correcting crosstalk components included in the focusing error signal using the data tables which are formed, as described above, will be described below. In a normal operation, the adjuster 38 monitors the tracking error signal and the binary signal of the sum signal output from the comparator 46. For example, when the binary signal is at low level, and the tracking error signal level is $a_{16}$, the data table is looked up to read out the corresponding crosstalk level $c_{16}$. Then, the adjuster 38 outputs the level data $c_{16}$ to the correction addition point 32 as a correction signal, and the correction signal is subjected from the focusing error signal. With this operation, since the focusing error signal at that time includes crosstalk components of level $c_{16}$, it can be corrected to a pure focusing error signal which does not include crosstalk components by subtracting the correction signal from the focusing error signal.

Of course, when the adjuster 38 outputs the correction signal to the correction addition point 32, the correction signal is converted into an analog signal by a D/A converter in the adjuster 38. On the other hand, when the binary signal is at low level, and the tracking error signal level is $a_{17}$, the corresponding crosstalk level $c_{17}$ is read out from the data table, and is output to the correction addition point 32. In this manner, the adjuster 38 looks up the data table to output a crosstalk level corresponding to the tracking error signal level as a correction signal, thus performing processing for canceling crosstalk components in the focusing error signal.

In this embodiment, the data tables are formed by causing the tracking error signal level and the binary signal of the sum signal to correspond to the crosstalk level, and in an ON operation of the apparatus, crosstalk components are corrected by looking up the data tables. In this manner, as in the first to third embodiments, crosstalk components included in the focusing error signal can be effectively canceled. As a result, the focusing servo upon a seek operation can be stabilized, and the precision of the focusing servo upon execution of the tracking control can be improved. Since this embodiment does not require components such as multipliers for generating a correction signal, the arrangement can be simplified. Furthermore, the data tables are formed by directly detecting the tracking error signal, the binary signal, and the focusing error signal, and crosstalk components are corrected by looking up these data tables. Therefore, complicated processing such as calculations of multipliers is not required, and crosstalk components can be easily corrected. In particular, when this embodiment is realized by software, the load on a processor can be reduced very much.

In this embodiment, when the data tables are formed in correspondence with the position of the objective lens, the radial position on the optical disc 1, or the difference between the ROM portion and the recordable region on the partial ROM disc, crosstalk components can be corrected with higher precision, as a matter of course. Also, the filters 43 and 44 preferably comprise those with frequency characteristics corresponding to the characteristics of the focusing servo loop, as has been described above with reference to FIG. 20. In particular, the filter 43 for fetching the focusing error signal preferably comprises one with the characteristics shown in FIGS. 14A and 14B or FIGS. 16A and 16B.

FIG. 23 is a block diagram showing the fifth embodiment of the present invention. In each of the above embodiments, the multipliers are adjusted or the data table is formed while the tracking servo loop is kept OFF. However, in this embodiment, a data table for crosstalk correction is formed while the tracking servo is kept ON. In FIG. 23, a phase compensator 50 for stabilizing the tracking servo loop, a driver 51, a tracking actuator 52, and a driving addition point 53 for adding a signal from the adjuster 38 to the tracking servo loop constitute the tracking servo loop. Since this embodiment does not use the binary signal of the sum signal to form the data table, the comparator 46 is not arranged. Other arrangements are the same as those in FIG. 21.

The operation of this embodiment will be described below. When the apparatus is started or an optical disc is exchanged, a data table for crosstalk correction is similarly formed. When the data table is formed, the focusing servo is turned on, and thereafter, the tracking servo is turned on. This point is different from the above embodiments. In this manner, while the two servo loops are ON, the adjuster 38 outputs a driving signal for driving the tracking actuator 52 to the driving addition point 53, and the tracking actuator 52 is driven to oscillate the objective lens 7 within a range of one track. More specifically, the objective lens 7 is driven, so that the light beam is scanned to the right and left to be centered about the center of the track within the range of one track in place of crossing tracks, and the adjuster 38 detects the tracking error signal and the focusing error signal at that time to form the data table for crosstalk correction. As a driving signal to be output to the driving addition point 53, a driving signal corresponding to the frequency band of the focusing servo loop, e.g., a driving signal defined by a sine wave of a frequency in the frequency band or a sine wave of a frequency twice that in the frequency band is preferably used.

Figure 24A:
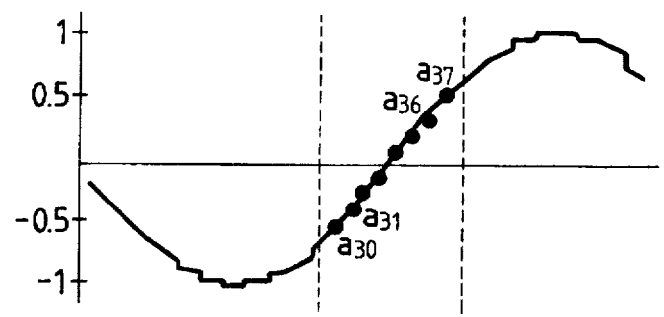
FIGS. 24A and 24B are signal waveform charts respectively showing a tracking error signal detected for generating a table in the embodiment shown in FIG. 23, and crosstalk components in the focusing error signal.
Figure 24B:
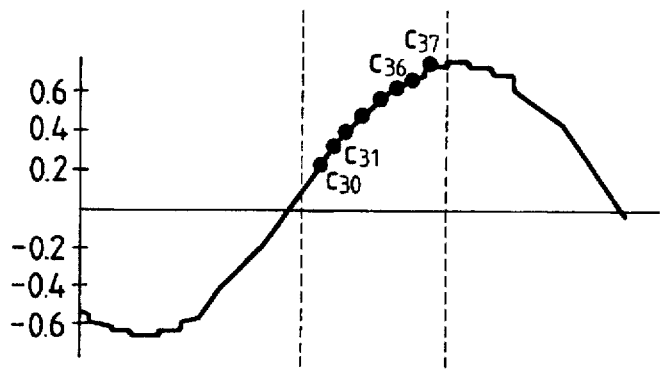

FIG. 24A shows the tracking error signal obtained when the objective lens 7 is oscillated within a range of one track, and FIG. 24B shows crosstalk components in the focusing error signal. The adjuster 38 detects tracking error signal levels and crosstalk levels at predetermined sampling periods as in the embodiment shown in FIG. 21, and stores these levels in correspondence with each other, thus forming a data table. For example, when the tracking error signal level in FIG. 24A is $a_{30}$, since the crosstalk level in FIG. 24B is $c_{30}$, the level $c_{30}$ is stored in correspondence with the level $a_{30}$. Similarly, the adjuster 38 stores the crosstalk level $c_{31}$ in the memory in correspondence with the tracking error signal level $a_{31}$, $c_{36}$ in correspondence with the level $a_{36}$, and so on, and a data table is formed by storing a predetermined number of data.

When the tracking error signal level and the crosstalk level are detected, they are converted into digital signals by an A/D converter in the adjuster 38, and the digital signals are fetched in the adjuster 38. In FIGS. 24A and 24B, the number of sampling points of each of the tracking error signal and crosstalk components is 8. At this time as well, the number of sampling points can be arbitrarily set in correspondence with the correction precision of crosstalk components and the limitation on the memory capacity. Upon formation of a data table, the data table is preferably formed in units of levels obtained by equally dividing the level of the tracking error signal, e.g., in units of 0.05 V if the amplitude width is 0.5 V.

When crosstalk components are corrected using the data table, the adjuster 38 detects the tracking error signal as in the embodiment shown in FIG. 21, and outputs a corresponding crosstalk level on the data table to the correction addition point 32, thus achieving crosstalk correction. For example, as shown in FIG. 24A, if the tracking error signal level is $a_{31}$, the corresponding crosstalk level $c_{31}$ is read out, and the readout level data is output to the correction addition point 32 as a correction signal. In this manner, a correction signal corresponding to crosstalk components is subtracted from the focusing error signal, thus generating a pure focusing error signal which includes no crosstalk components. Of course, when the adjuster 38 outputs a correction signal to the correction addition point 32, it is converted into an analog signal by a D/A converter in the adjuster 38. Thus, the adjuster 38 looks up the data table and outputs a crosstalk level corresponding to the tracking error signal level as a correction signal, thus correcting crosstalk components.

In this embodiment, the objective lens 7 is driven within a range of one track while the focusing servo and the tracking servo are kept ON, and the tracking error signal and the focusing error signal obtained at that time are detected to form a data table. With this processing, since the generation range of a tracking error is narrowed and the step width of correction data can be reduced as compared to a case wherein the tracking servo is turned off, the correction precision of crosstalk components can be further improved. Therefore, as compared to the first to fourth embodiments, crosstalk components can be corrected more precisely, and focusing correction can be performed with higher precision.

When information is actually recorded/reproduced, since the tracking servo loop is kept ON, and a normal operation requires higher servo performance than in a seek operation, this embodiment can perform crosstalk correction with highest precision even when such high-precision servo is required. Furthermore, in this embodiment, since no multipliers need be calculated, the hardware arrangement can be simplified, and the load on a processor can be reduced when the processing is realized by software. Furthermore, since this embodiment does not require the comparator 46, the arrangement can be further simplified as compared to the embodiment shown in FIG. 21.

In this embodiment as well, the data table is preferably formed in correspondence with the position of the objective lens 7, the radial position of the optical disc 1, or the difference between the ROM portion and the recordable region in the case of a partial ROM disc. Since this embodiment has high crosstalk correction precision, as described above, the crosstalk correction of this embodiment may be adopted in a state wherein the tracking servo loop is ON, and the crosstalk correction of the first to fourth embodiments may be adopted in a seek operation other than the above-mentioned state. In this manner, the crosstalk correction methods may be selectively used in correspondence with the required correction precision.

Figure 25:
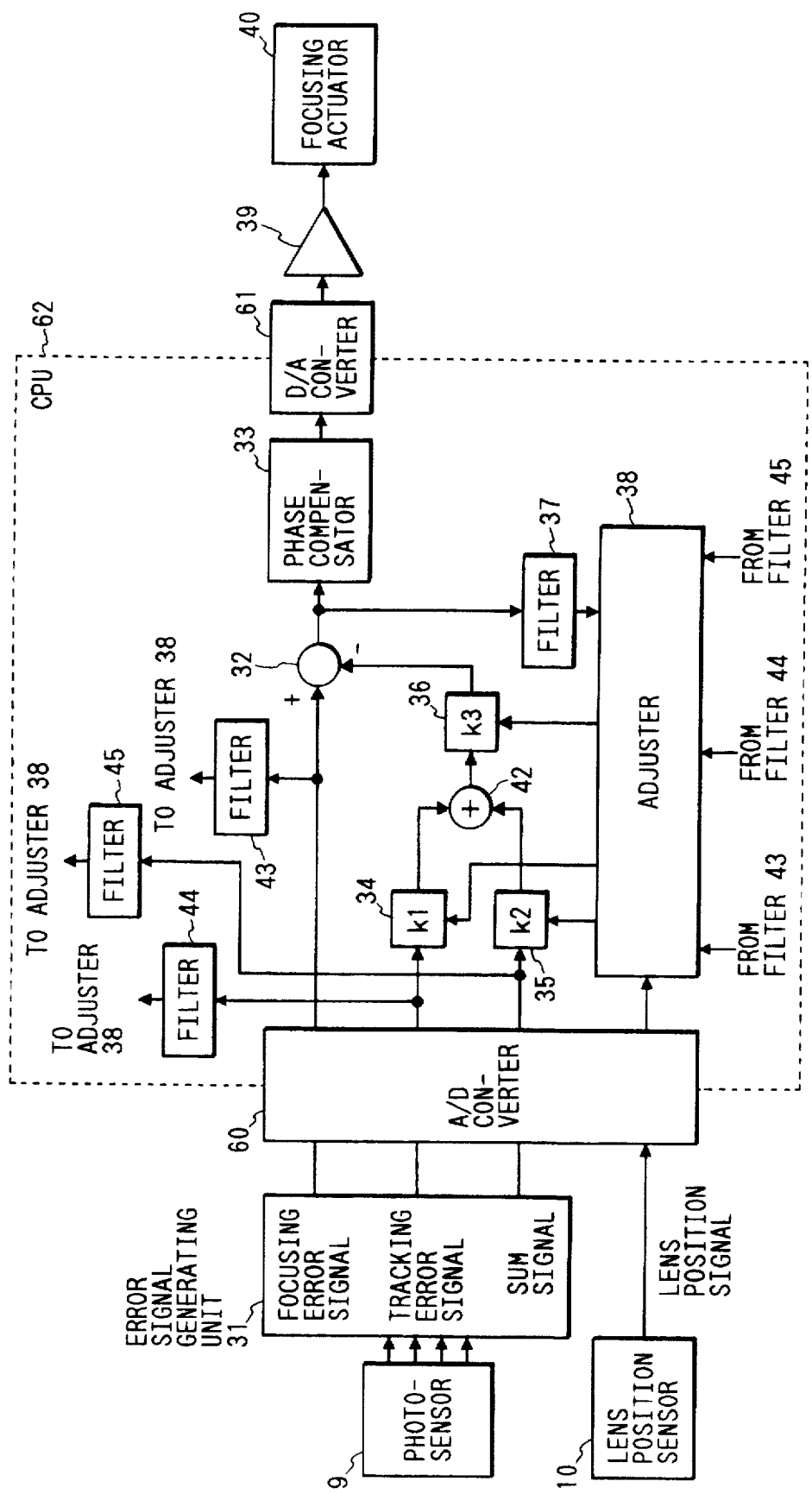
FIG. 25 is a block diagram showing the sixth embodiment of the present invention.

FIG. 25 is a block diagram showing the sixth embodiment of the present invention. In this embodiment, the embodiment shown in FIG. 20 is realized by digital processing. A focusing error signal, a tracking error signal, and a sum signal generated by the error signal generating unit 31 are converted into digital signals by an A/D converter 60, and the digital signals are fetched by a CPU 62. The CPU 62 digitally processes all the functions of the correction addition point 32 and the phase compensator 33 in the tracking servo loop, and controls the focusing servo and the tracking servo by digital signal processing. The output from the phase compensator 33 is converted into an analog signal by a D/A converter 61, and the analog signal is output to the driver 39. The CPU 62 also digitally processes the functions of the multipliers 34 to 36, and the filters 37, 43, and 44, and calculates the multipliers k1 to k3 by executing calculation processing on the basis of the obtained error signals and sum signal, as has been described above with reference to FIG. 20, thereby achieving crosstalk correction.

Figure 26:
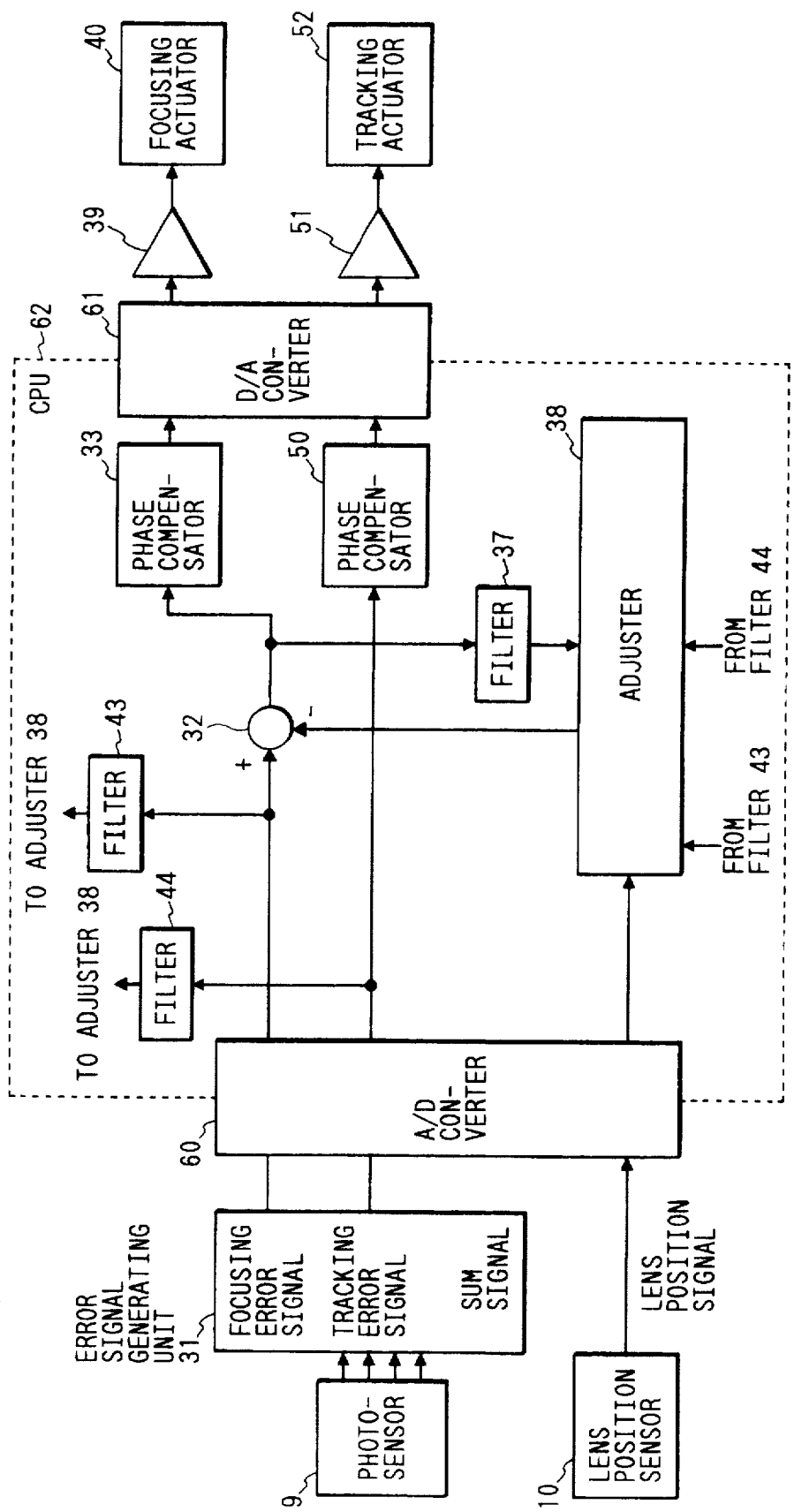
FIG. 26 is a block diagram showing the seventh embodiment of the present invention.

FIG. 26 is a block diagram showing the seventh embodiment of the present invention. In this embodiment as well, the embodiment shown in FIG. 23 is realized by digital processing. In this embodiment as well, the CPU 62 digitally controls the focusing servo and the tracking servo. Also, as has been described above with reference to FIG. 23, the CPU 62 forms a data table for crosstalk correction, and performs crosstalk correction by looking up the data table in a normal operation. The A/D converter 60 and the D/A converter 61 in FIG. 25 or 26 may be incorporated in the CPU 62, or may be externally arranged.

In this manner, when the focusing servo and the tracking servo, or calculations of multipliers and formation of a data table are achieved by digital processing, hardware components such as multipliers, a phase compensator, and the like can be simplified very much. In the above description, the embodiments shown in FIGS. 20 and 23 are realized by digital processing. In addition, the other embodiments can be realized by digital processing. When the digital processing is adopted, for example, if different crosstalk correction methods are selectively used depending on the ON/OFF states of the tracking servo, as described above, the switching control can be easily realized. In addition, when the digital processing is adopted, the sum signal can be easily digitally binarized by comparing a digital value converted by the A/D converter 60 with a threshold value in the CPU 62.

As described above, according to the present invention, the following effects can be expected.

(1) When a crosstalk correction signal is generated based on the tracking error signal and the sum signal, and is applied to the focusing servo loop, crosstalk components included in the focusing error signal can be effectively canceled, and the focusing servo in a seek operation of the optical head can be stabilized. In addition, during the tracking servo control, the focusing servo can be controlled with high precision.

(2) When a data table is formed by causing the amplitude of crosstalk components to correspond to the amplitude of the tracking error signal in accordance with the binary signal of the sum signal, and the crosstalk correction value is applied to the focusing servo loop by looking up the data table, crosstalk components in the focusing error signal can be similarly canceled, and the focusing servo in a seek operation of the optical head can be stabilized. In addition, the focusing servo precision upon execution of the tracking servo can be improved.

(3) In this case, since the data table is directly formed on the basis of the binary signal of the sum signal, the focusing error signal, and the tracking error signal, no calculation processing is required, and the arrangement can be simplified. In addition, when processing is realized in a software manner, the load on a processor can be reduced.

(4) When the tracking error signal and crosstalk components are fetched while the light beam is oscillated within a range of one track, a data table is formed by causing the amplitude of crosstalk components to correspond to the amplitude of the tracking error signal, and a crosstalk correction value is applied to the focusing servo loop by looking up the data table, crosstalk components included in the focusing error signal can be precisely cancelled in the tracking control, and crosstalk components can be corrected with high precision. Since no calculation processing is required, the arrangement can be simplified, and when processing is realized by software, the load on a processor can be reduced.

(5) When a table is formed by calculating a crosstalk correction value in correspondence with the position, in the tracking direction, of the objective lens, crosstalk components can be corrected with higher precision in accordance with the position of the objective lens.

(6) When a table is formed by calculating a crosstalk correction value in correspondence with the position on a recording medium, crosstalk components can be corrected with higher precision in accordance with the position on the recording medium.

(7) When a recording medium is a partial ROM recording medium, and crosstalk correction values are calculated in correspondence with a ROM region and a recordable region to form tables, crosstalk components can be corrected with higher precision depending on the regions on the recording medium.

What is claimed is:

1. An optical information recording and/or reproducing apparatus, which comprises an optical head for irradiating an optical information recording medium having a plurality of information tracks with a light beam, a photosensor which detects light received via the optical information recording medium and is split into a plurality of sections, and signal generating means for generating a focusing error signal, a tracking error signal, and a sum signal as a sum total of outputs from the split sections of the photosensor on the basis of outputs from the photosensor, comprising:

correction signal generating means for generating a correction signal whose phase and amplitude match a phase and an amplitude of crosstalk components included in the focusing error signal by adjusting an output of the signal generating means to adjust the tracking error signal when the light beam crosses the information tracks and to adjust the sum signal when the light beam crosses the information tracks, respectively; and correction signal applying means for cancelling the crosstalk components included in the focusing error signal by applying the correction signal to a focusing servo loop.

2. An apparatus according to claim 1, wherein said correction signal generating means comprises:

a first multiplier for multiplying the tracking error signal with a multiplier;

a second multiplier for multiplying the sum signal with a multiplier;

an adder for adding the outputs from said first and second multipliers;

a third multiplier for multiplying the output from said adder with a multiplier, and outputting the correction signal of crosstalk components; and adjusting means for adjusting said first, second, and third multipliers, said adjusting means changing said first and second multipliers while monitoring the amplitude of the correction signal output from said correction signal applying means to adjust said first and second multipliers, so that the amplitude of the correction signal becomes a minimum, thereby causing the phase of the correction signal to match the phase of the crosstalk components included in the focusing error signal, and changing said third multiplier to adjust said third multiplier, so that the amplitude of the correction signal becomes a minimum, thereby causing the amplitude of the correction signal to match the amplitude of the crosstalk components included in the focusing error signal.

3. An apparatus according to claim 2, further comprising a filter which is arranged between an output of said correction signal applying means and said adjusting means, and compensates for low-frequency characteristics of a focusing servo loop with respect to the crosstalk components.

4. An apparatus according to claim 1, further comprising storage means for storing correction signal values of said correction signal generating means corresponding to positions, in a tracking direction, of an objective lens for focusing the light beam in the form of a table, and wherein the correction signal is adjusted in correspondence with the position of the objective lens by looking up correction signal values in the table, thereby correcting the crosstalk components in the focusing error signal in correspondence with the position of the objective lens.

5. An apparatus according to claim 4, wherein when the table corresponding to the position of the objective lens is to be formed, the position of the objective lens is controlled by giving a target position of the objective lens to a position control loop for controlling the position of the objective lens by feeding back an output from a lens position sensor for detecting the position, in the tracking direction, of the objective lens to an input of the tracking servo loop, thereby fixing the objective lens at a desired position.

6. An apparatus according to claim 1, further comprising storage means for storing correction signal values of said correction signal generating means corresponding to a difference between a ROM region and a recordable region of the recording medium in the form of a table, and wherein the correction signal is adjusted in correspondence with the position on the recording medium by looking up correction signal values in the table, thereby correcting the crosstalk components in the focusing error signal in correspondence with each region of the recording medium.

7. An apparatus according to claim 1,
wherein said correction signal generating means generates the correction signal by adjusting multipliers to be multiplied by the tracking error signal and the sum signal, said apparatus further comprising storage means for storing correction signal values of said correction signal generating means in the form of a table for crosstalk correction, wherein when the multipliers are to be adjusted or when the table for crosstalk correction is to be formed, the light beam is controlled to cross the information track at a desired track crossing frequency by inputting a predetermined signal to a position control loop for controlling the position of the objective lens by feeding back an output from a lens position sensor for detecting the position, in the tracking direction, of the objective lens to an input of the tracking servo loop.

8. An optical information recording and/or reproducing method for irradiating an optical information recording medium having a plurality of information tracks with a light beam, detecting light received via the optical information recording medium using a photosensor which is split into a plurality of sections, and generating with signal generating means a focusing error signal, a tracking error signal, and a sum signal as a sum total of outputs from the split sections of the photosensor on the basis of outputs from the photosensor, comprising the steps of:

generating a correction signal whose phase and amplitude match a phase and an amplitude of crosstalk components included in the focusing error signal by adjusting an output of the signal generating means to adjust the tracking error signal when the light beam crosses the information tracks and to adjust the sum signal when the light beam crosses the information tracks, respectively; and canceling the crosstalk components included in the focusing error signal by applying the correction signal to a focusing servo loop.

* * * * *

UNITED STATES PATENT AND TRADEMARK OFFICE
CERTIFICATE OF CORRECTION

PATENT NO. : 5,768,227
DATED : June 16, 1998
INVENTOR(S) : HISATOSHI BABA

Page 1 of 2

It is certified that error appears in the above-identified patent and that said Letters Patent is hereby corrected as shown below:

ON THE COVER PAGE

[54] In the title:

"RECORDING AND" should read --RECORDING AND/--.

Column 1

Line 1, "AND" should read --AND/--.
Line 24, Close up right margin.
Line 25, Close up left margin.

Column 5

Line 35, "onto" should be deleted.

Column 7

Line 59, "component s" should read --components--.

Column 14

Line 9, "t rack" should read --track--.
Line 34, "na" should read --a--.
Line 37, "characteristics," should read --characteristic,--.

UNITED STATES PATENT AND TRADEMARK OFFICE
CERTIFICATE OF CORRECTION

PATENT NO. : 5,768,227
DATED : June 16, 1998
INVENTOR(S) : HISATOSHI BABA

It is certified that error appears in the above-identified patent and that said Letters Patent is hereby corrected as shown below:

<u>Column 17</u>

Line 27, Close up right margin.
   Line 28, Close up left margin.

<u>Column 18</u>

Line 29, Close up right margin.
   Line 30, Close up left margin.

<u>Column 19</u>

Line 14,
"Input amplitude = $\{(k1.a_1)^2+(k2.a_2)^2]^{1/2}$ ....... (9)"
                    should read
--Input amplitude = $[(k1.a_1)^2+(k2.a_2)^2]^{1/2}$ ....... (9)--.

Signed and Sealed this

Twenty-fourth Day of August, 1999

Attest:

Q. TODD DICKINSON

*Attesting Officer*   *Acting Commissioner of Patents and Trademarks*